United States Patent
Yamamoto

(10) Patent No.: US 8,199,031 B2
(45) Date of Patent: *Jun. 12, 2012

(54) INPUT APPARATUS, CONTROL APPARATUS, CONTROL SYSTEM, CONTROL METHOD, AND PROGRAM THEREFOR

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1043 days.

This patent is subject to a terminal disclaimer.

(21) Appl. No.: 12/133,149

(22) Filed: Jun. 4, 2008

(65) Prior Publication Data

US 2008/0303697 A1    Dec. 11, 2008

(30) Foreign Application Priority Data

Jun. 6, 2007  (JP) ................................. 2007-149964

(51) Int. Cl.
*H03M 11/00*  (2006.01)

(52) U.S. Cl. ......................................................... 341/20
(58) Field of Classification Search ...................... 341/20
See application file for complete search history.

(56) References Cited

U.S. PATENT DOCUMENTS

| | | | |
|---|---|---|---|
| 5,453,758 A |   | 9/1995 | Sato |
| 6,047,132 A | * | 4/2000 | Maeda ............................ 396/53 |
| 7,328,123 B2 | * | 2/2008 | Hooge et al. ................. 702/150 |

FOREIGN PATENT DOCUMENTS

| | | |
|---|---|---|
| JP | 07-175583 | 7/1995 |
| JP | 10-124245 | 5/1998 |
| JP | 11-053104 | 2/1999 |
| JP | 2001-56743 | 2/2001 |
| JP | 3748483 | 12/2005 |

OTHER PUBLICATIONS

Office Action dated May 12, 2009, for corresponding Japanese Application No. 2007-149964.

* cited by examiner

*Primary Examiner* — Stephen W Jackson
(74) *Attorney, Agent, or Firm* — K&L Gates LLP

(57) ABSTRACT

An input apparatus includes a first acceleration sensor, a second acceleration sensor, a first angular velocity sensor, a second angular velocity sensor, and velocity information output means. The first acceleration sensor detects a first acceleration value in a first direction. The second acceleration sensor detects a second acceleration value in a second direction different from the first direction. The first angular velocity sensor detects a first angular velocity value about a first axis in the first direction. The second angular velocity sensor detects a second angular velocity value about a second axis in the second direction. The velocity information output means calculates, based on the first and second acceleration values and the first and second angular velocity values, a first velocity value in the first direction and a second velocity value in the second direction, and outputs information on the first velocity value and the second velocity value.

17 Claims, 25 Drawing Sheets

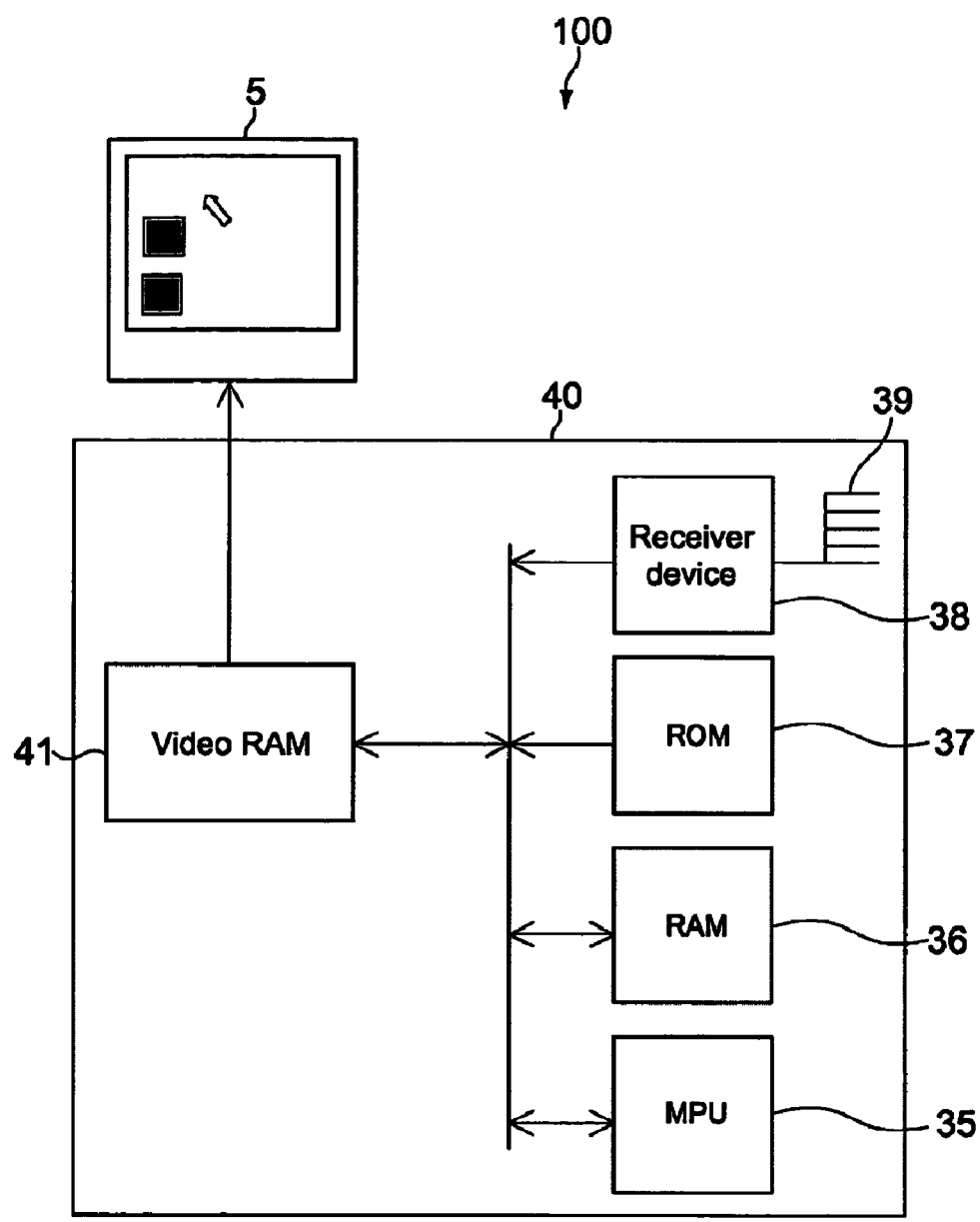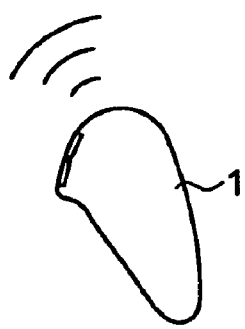
FIG.1

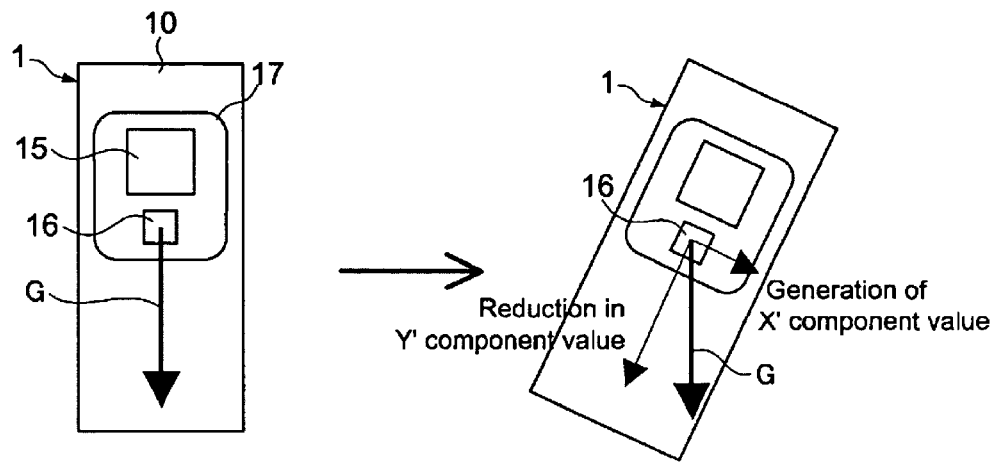
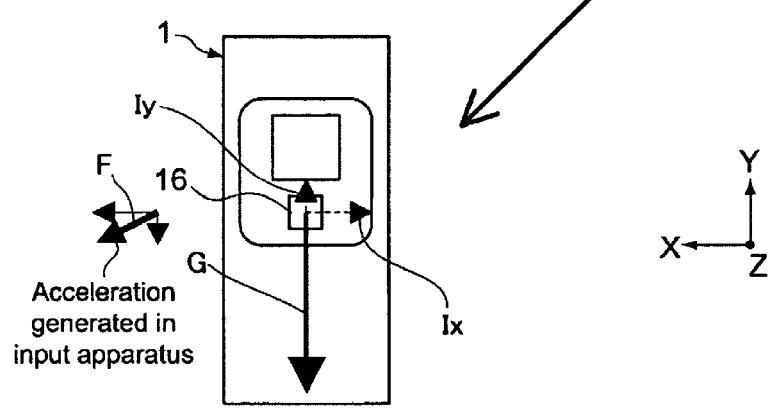
FIG.9A
FIG.9B
FIG.9C

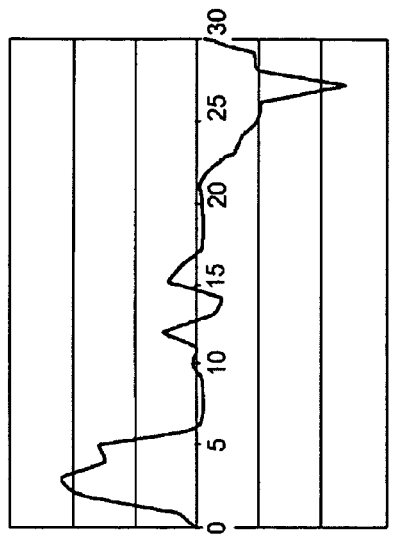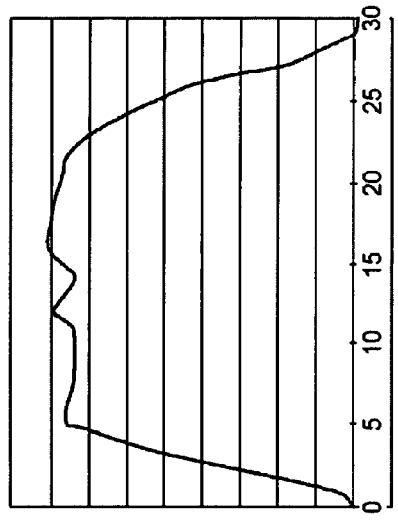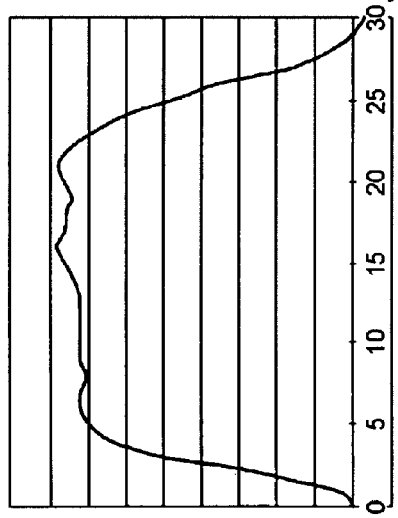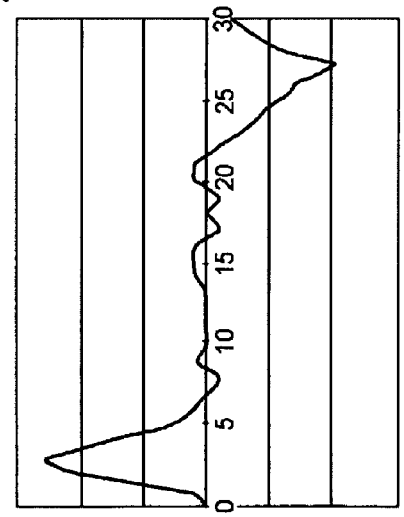
FIG. 15A Angular velocity signal
FIG. 15B Angular acceleration signal
FIG. 15C Acceleration signal
FIG. 15D Velocity signal

FIG. 20
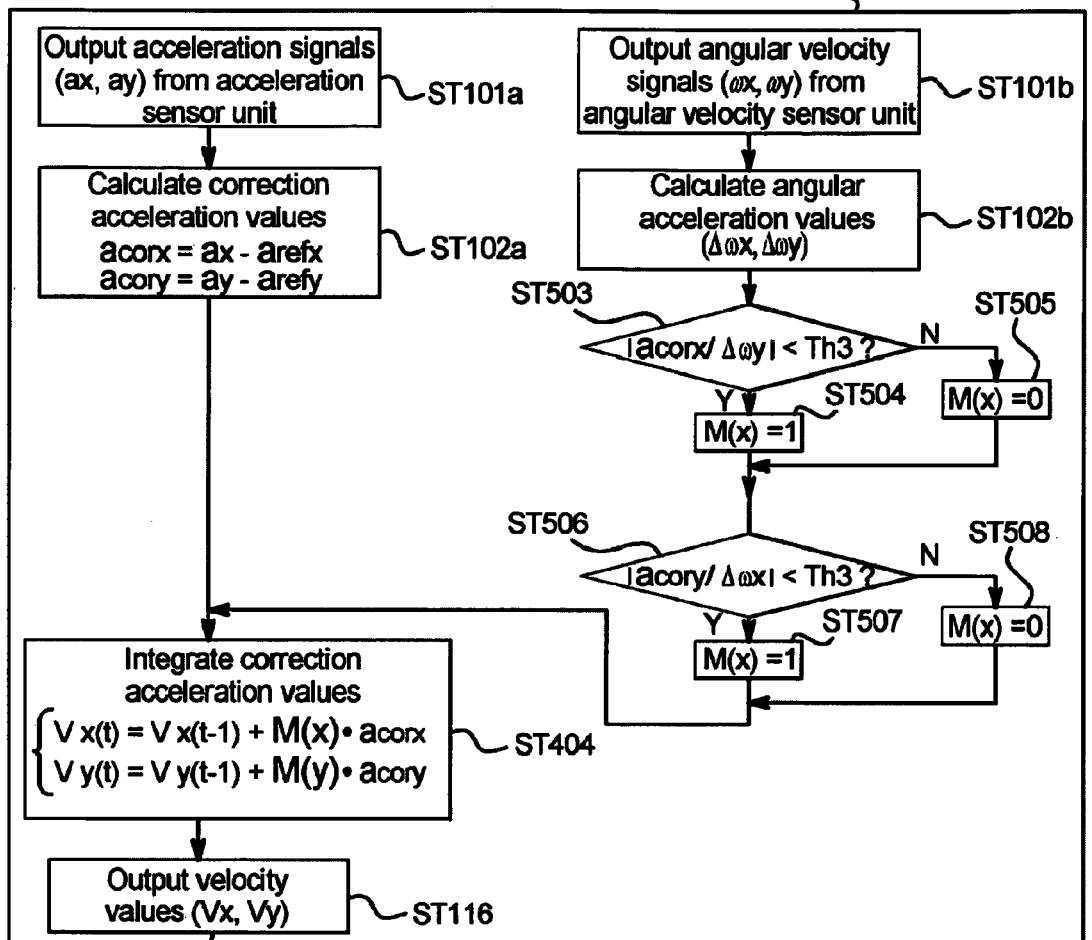
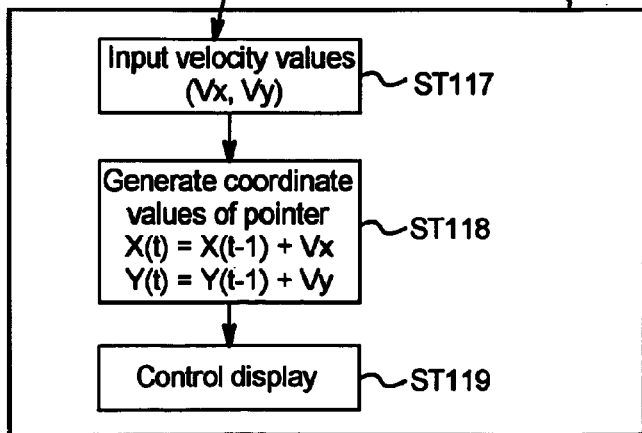

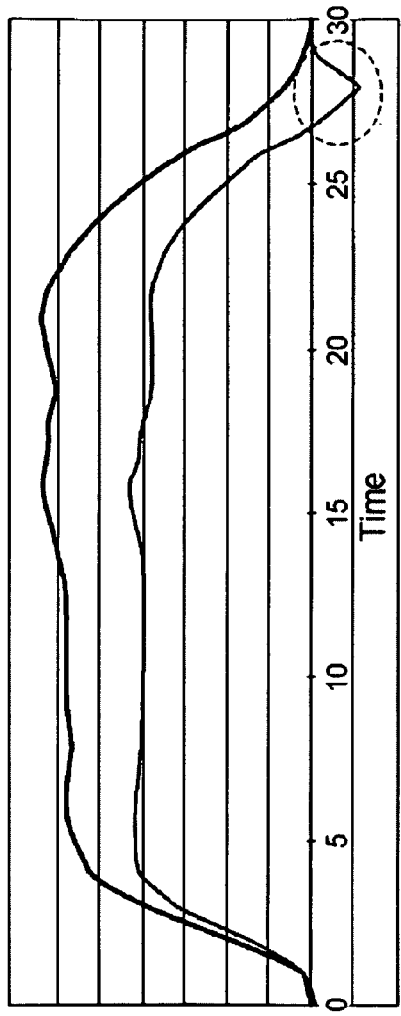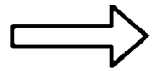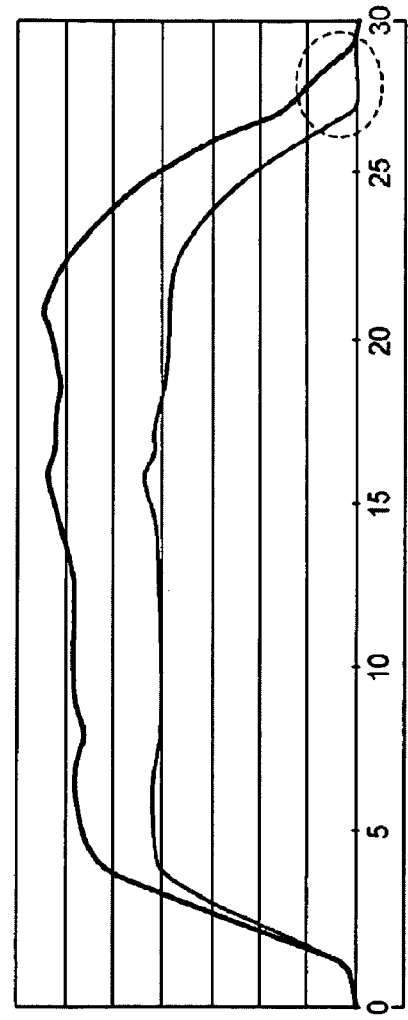
FIG. 22A  When signs are not compared with each other
FIG. 22B  When signs are compared with each other

INPUT APPARATUS, CONTROL APPARATUS, CONTROL SYSTEM, CONTROL METHOD, AND PROGRAM THEREFOR

CROSS REFERENCES TO RELATED APPLICATIONS

The present application claims priority to Japanese Patent Application JP 2007-149964 filed in the Japanese Patent Office on Jun. 6, 2007, the entire contents of which is being incorporated herein by reference.

BACKGROUND

The present application relates to an input apparatus of a 3-dimensional operation type for operating a GUI (Graphical User Interface), a control apparatus for controlling the GUI in accordance with operation information, a control system including those apparatuses, a control method, and a program therefor.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game machines used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 (paragraphs (0030) and (0031), FIG. 3; hereinafter referred to as Patent Document 1) and Japanese Patent No. 3,748,483 (paragraphs (0033) and (0041), FIG. 1; hereinafter referred to as Patent Document 2).

Patent Document 1 discloses an input apparatus including angular velocity gyroscopes of two axes, i.e., two angular velocity sensors. Each angular velocity sensor is a vibration-type angular velocity sensor. For example, upon application of angular velocity with respect to a vibrating body piezo-electrically vibrating at a resonance frequency, Colioris force is generated in a direction perpendicular to a vibration direction of the vibrating body. The Colioris force is in proportion with the angular velocity, so detection of the Colioris force leads to detection of the angular velocity. The input apparatus of Patent Document 1 detects angular velocities about two orthogonal axes by the angular velocity sensors, generates, based on the angular velocities, a command signal being location information of a cursor or the like displayed by display means, and transmits the command signal to the control apparatus.

Patent Document 2 discloses a pen-type input apparatus including three acceleration sensors (of three axes) and three angular velocity sensors (of three axes) (gyro). The pen-type input apparatus executes various calculations based on signals obtained by the three acceleration sensors and the three angular velocity sensors, to obtain a posture angle of the pen-type input apparatus.

Each of the acceleration sensors not only detects acceleration of the input apparatus operated by a user but also gravity acceleration. The input apparatus cannot distinguish the gravity with respect to the input apparatus from an inertial force of the moving input apparatus since physical quantities thereof are the same. In a case where, for example, the user swiftly moves the input apparatus in a horizontal direction, a resultant force of the inertial force and the gravity is erroneously recognized to be in a gravity direction (downward direction). The pen-type input apparatus according to Patent Document 2 detects angular velocities about the three axes and accelerations in the three axes directions, i.e., detects amounts of all of the six degrees of freedom. The problem concerning the inertial force and the gravity is thus solved.

SUMMARY

Since the pen-type input apparatus of Patent Document 2 employs the three acceleration sensors and the three angular velocity sensors, the configuration thereof is complicated and a calculation amount increases, which leads to a fear that a time delay may occur. As a result, an operation timing of a user is out of sync with a movement timing of a GUI on a screen, which causes a user to feel that his operation does not match the movement. In addition, the increased calculation amount increases power consumption. For an input apparatus that incorporates a battery thereinto, for example, the increased power consumption is a serious problem.

The input apparatus including the acceleration sensors executes integral of signals output from the acceleration sensors to thereby obtain velocity information. Since an integral error occurs in principle, the GUI moves differently from the input apparatus operated by the user, which is problematic.

In view of the above circumstances, there is a need for an input apparatus, a control apparatus, a control system, a control method, and a program therefor, that are capable of reducing a calculation amount.

Further, there is a need for a technique that is capable of reducing a calculation amount as described above, and addresses a problem of an integral error generated when calculating velocity values based on an output from the acceleration sensors or a problem of a gravity effect.

According to an embodiment, an input apparatus includes a first acceleration sensor, a second acceleration sensor, a first angular velocity sensor, a second angular velocity sensor, and velocity information output means. The first acceleration sensor detects a first acceleration value in a first direction. The second acceleration sensor detects a second acceleration value in a second direction different from the first direction. The first angular velocity sensor detects a first angular velocity value about a first axis in the first direction. The second angular velocity sensor detects a second angular velocity value about a second axis in the second direction. The velocity information output means calculates, based on the first acceleration value, the second acceleration value, the first angular velocity value, and the second angular velocity value, a first velocity value in the first direction and a second velocity value in the second direction, and outputs information on the first velocity value and the second velocity value.

A normal way for a man to operate the input apparatus is to use at least one of a rotation about a base of an arm, bending of an elbow, and a turn of a wrist. So, it is considered that when acceleration is generated, angular acceleration is consequently generated in the same direction. The same can be applied to velocity. When velocity is generated, angular velocity is consequently generated in the same direction. In other words, there is a correlation between the acceleration and the angular acceleration, and there is also a correlation between the velocity and the angular velocity. That is, according to this embodiment, one of the acceleration sensor and the angular velocity sensor can be used as an auxiliary sensor for the other. As a result, the embodiment only requires four sensors in total, i.e., the acceleration sensors of two different axes and the angular velocity sensors of two different axes. That is, compared to a past case where the acceleration sensors of three axes and the angular velocity sensors of three axes are provided, the number of sensors can be reduced. In addition, the calculation amount can be reduced owing to the above correlations, to thereby prevent a delay from occurring. Further, since the calculation amount is reduced, power consumption can also be reduced.

In principle, a velocity value can be obtained by executing integral of an acceleration value. However, according to this embodiment, because an angular velocity value is used to calculate the velocity value, by the velocity information output means for executing proper calculation processing, an integral error, a gravity effect, and the like can be reduced. Specifically, the velocity information output means executes processing as in the following embodiments.

In an embodiment, the velocity information output means calculates a difference between the first acceleration value and a first reference acceleration value to obtain a first correction acceleration value, the first reference acceleration value being a component value of a gravity acceleration in the first direction, and calculates, based on the first correction acceleration value, the first velocity value. The gravity effect with respect to the first acceleration sensor can thus be suppressed.

Similarly, the velocity information output means may calculate a difference between the second acceleration value and a second reference acceleration value to obtain a second correction acceleration value, the second reference acceleration value being a component value of the gravity acceleration in the second direction, and calculate, based on the second correction acceleration value, the second velocity value.

In an embodiment, the input apparatus further includes velocity correction means for correcting, based on the second angular velocity value, the first velocity value. Assuming a case where the input apparatus is actually used by a user, it can be considered that velocity (first velocity) depends on angular velocity (second angular velocity) in the direction same as the direction of the velocity. That is, in the case where the user operates the input apparatus, generation of angular velocity in a certain direction can be considered as generation of velocity in the same direction. In view of the above, the first velocity value can be corrected based on the second angular velocity value. Integral error can thus be suppressed.

Similarly, the input apparatus may further include means for correcting, based on the first angular velocity value, the second velocity value.

In an embodiment, the velocity correction means sets, in a case where an absolute value of the second angular velocity value is smaller than a threshold value, the first velocity value to zero. Alternatively, the velocity correction means may set, in a case where an absolute value of the first angular velocity value is smaller than the threshold value, the second velocity value to zero. Since the first velocity value and the second velocity value are corrected individually as described above, in a case where, for example, the angular velocity value about one of the first axis and the second axis is smaller than the predetermined threshold value, only the angular velocity value concerned is corrected. Thus, the velocity correction means can reset the first or second velocity value to zero at time intervals practically short enough. As a result, the input apparatus is hardly affected by an integral error, gravity with respect to the first (second) acceleration sensor, and DC offset due to temperature drift.

In an embodiment, the input apparatus further includes angular acceleration calculation means and judging means. The angular acceleration calculation means calculates, based on the second angular velocity value, a second angular acceleration value about the second axis. The judging means judges, based on the second angular acceleration value, whether or not to update the first reference acceleration value. Assuming a case where the input apparatus is actually used by a user, it can be considered that acceleration (first acceleration) depends on angular acceleration (second angular acceleration) in the direction same as the direction of the acceleration. Thus, the first acceleration value can be calibrated based on the second angular acceleration value. That is, in this case, the first acceleration value can be calibrated by updating the first reference acceleration value. The gravity effect and the DC offset effect can thus be suppressed.

The same can be applied to the first angular velocity value. That is, the first angular acceleration value may be calculated, and the second reference acceleration value may be updated based on the first angular acceleration value.

In an embodiment, the input apparatus further includes update means for updating, in a case where an absolute value of the second angular acceleration value is smaller than a threshold value, the first reference acceleration value.

Similarly, the update means may update, in a case where an absolute value of the first angular acceleration value is smaller than the threshold value, the second reference acceleration value. Since the first reference acceleration value and the second reference acceleration value are updated individually as in the above case, the update means can correct the first or second reference acceleration value at time intervals practically short enough. The input apparatus is thus hardly affected by the gravity and DC offset.

In an embodiment, the input apparatus further includes angular acceleration calculation means for calculating, based on the second angular velocity value, a second angular acceleration value about the second axis. Further, the velocity information output means calculates, by using a correlation characteristic representing a correlation between the first acceleration value and the second angular acceleration value, the first velocity value. In a case where a user actually operates the input apparatus, a signal of the first acceleration and a signal of the second angular acceleration have similar profiles. As the acceleration signal is more affected by gravity, the difference between the profiles becomes larger. The velocity information output means calculates the first (or second) velocity value by using the above correlation characteristics, so the input apparatus can obtain a realistic velocity value that is not affected by the gravity.

Similarly, the input apparatus may further include angular acceleration calculation means for calculating, based on the first angular velocity value, a first angular acceleration value about the first axis. Further, the velocity information output means may calculate, by using a correlation characteristic representing a correlation between the second acceleration value and the first angular acceleration value, the second velocity value.

Alternatively, the velocity information output means can calculate, by using a correlation characteristic representing a correlation between the first (second) correction acceleration value and the second (first) angular acceleration value, the first (second) velocity value. The same can be applied to the following.

In an embodiment, the correlation characteristic between the first angular velocity value and the second angular acceleration value is used. Alternatively, a correlation characteristic between the first (second) velocity value and the second (first) angular velocity value may be used. The same can be applied to the following.

In an embodiment, the correlation characteristic is one of a correlation coefficient and a correlation function using the first acceleration value and the second angular acceleration value. Further, the velocity information output means calculates, by multiplying the first acceleration value by one of the correlation coefficient and the correlation function respectively being a weight coefficient and a weight function, the first velocity value. The same may be applied to the second acceleration value and the first angular acceleration value.

In an embodiment, alternatively, the correlation characteristic is a ratio between the first acceleration value and the second angular acceleration value. The velocity information output means calculates, by using the ratio, the first velocity value. The calculation amount can thus be reduced. The same may be applied to the second acceleration value and the first angular acceleration value. For example, the velocity information output means can use a result of a judgment on whether an absolute value of (the first acceleration value/the second angular acceleration value) is equal to or larger than a threshold value as a reference to thereby determine whether or not to update the first velocity value. The calculation amount can thus be further decreased. Alternatively, in the case where the first reference acceleration value is updated as described above, the velocity information output means may use, when the absolute value of (the first acceleration value/the second angular acceleration value) is equal to or larger than the threshold value, the previous first velocity value as it is, and set the previous first velocity value as a present first velocity value.

In an embodiment, the velocity information output means includes an update means for recording and updating at least the first velocity value calculated. Further, the velocity information output means judges whether or not signs of the first acceleration value and the second angular acceleration value coincide with each other. Further, the update means avoids to update, in a case where the signs fail to coincide with each other, the first acceleration value. That is, the previous first velocity value may be set as the present first velocity value. In a case where, for example, the posture of the input apparatus is abruptly changed, or a case where the time period during which the input apparatus moves at a constant velocity is extremely short, there is a fear that the acceleration in a direction opposite to an inertial force (acceleration) with respect to the input apparatus is output. In this case, the signs are compared with each other as in this embodiment, to thereby address the above problem. The same may be applied to the second acceleration value and the first angular acceleration value.

According to another embodiment, a control apparatus controlling a user interface displayed on a screen based on input information output from an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, includes reception means and coordinate information generation means. The reception means receives, as the input information, information on the first acceleration value, the second acceleration value, the first angular velocity value, and the second angular velocity value. The coordinate information generation means calculates, based on the received input information, a first velocity value in the first direction and a second velocity value in the second direction, and generates coordinate information on the user interface on the screen.

In an embodiment, the preamble portion "a control apparatus controlling a user interface . . . in the second direction," is a description for specifying the contents of an embodiment.

According to another embodiment, a control system includes an input apparatus and a control apparatus. The input apparatus includes a first acceleration sensor, a second acceleration sensor, a first angular velocity sensor, a second angular velocity sensor, and velocity information output means. The first acceleration sensor detects a first acceleration value in a first direction. The second acceleration sensor detects a second acceleration value in a second direction different from the first direction. The first angular velocity sensor detects a first angular velocity value about a first axis in the first direction. The second angular velocity sensor detects a second angular velocity value about a second axis in the second direction. The velocity information output means calculates, based on the first acceleration value, the second acceleration value, the first angular velocity value, and the second angular velocity value, a first velocity value in the first direction and a second velocity value in the second direction, and outputs information on the first velocity value and the second velocity value as input information. The control apparatus includes reception means and coordinate information generating means. The reception means receives the input information. The coordinate information generation means generates, based on the received input information, coordinate information on the user interface on the screen.

According to another embodiment, a control system includes an input apparatus and a control apparatus. The input apparatus includes a first acceleration sensor, a second acceleration sensor, a first angular velocity sensor, a second angular velocity sensor, and output means. The first acceleration sensor detects a first acceleration value in a first direction. The second acceleration sensor detects a second acceleration value in a second direction different from the first direction. The first angular velocity sensor detects a first angular velocity value about a first axis in the first direction. The second angular velocity sensor detects a second angular velocity value about a second axis in the second direction. The output means outputs, as input information, information on the first acceleration value, the second acceleration value, the first angular velocity value, and the second angular velocity value. The control apparatus includes reception means and coordinate information generation means. The control apparatus including reception means receives the input information. The coordinate information generation means calculates, based on the received input information, a first velocity value in the first direction and a second velocity value in the second direction, and generates, based on the first velocity value and the second velocity value, coordinate information on the user interface on the screen.

According to another embodiment, a control method controlling a user interface on a screen includes detecting a first acceleration value of the input apparatus in a first direction, detecting a second acceleration value of the input apparatus in a second direction different from the first direction, detecting a first angular velocity value of the input apparatus about a first axis in the first direction, detecting a second angular velocity value of the input apparatus about a second axis in the second direction, calculating, based on the first acceleration value, the second acceleration value, the first angular velocity value, and the second angular velocity value, a first velocity value in the first direction and a second velocity value in the second direction, and generating, based on the first velocity value and the second velocity value, coordinate information on the user interface on the screen.

According to another embodiment, a control apparatus controlling a user interface displayed on a screen based on input information output from an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, includes reception unit and coordinate information generation unit. The reception unit receives, as the input information, information on the first acceleration value, the second acceleration value, the first angular velocity value, and the second angular velocity value. The coordinate information generation unit calculates, based on the received input information, a first velocity value in the first direction and a second velocity value in the second direction, and generates coordinate information on the user interface on the screen.

As described above, according to the embodiments, a calculation amount can be reduced and power consumption can be suppressed. Further, an integral error of the acceleration sensor or a gravity effect can be reduced.

Additional features and advantages are described herein, and will be apparent from the following Detailed Description and the figures.

BRIEF DESCRIPTION OF THE FIGURES

FIG. 1 is a diagram showing a control system according to an embodiment;

FIG. 9 are diagrams for illustrating a gravity effect with respect to an acceleration sensor unit;

FIG. 15 are graphs respectively showing simulations of an angular velocity signal (FIG. 15A), an angular acceleration signal (FIG. 15B), an acceleration signal (FIG. 15C), and a velocity signal (FIG. 15D);

FIG. 20 is a flowchart showing an operation of an input apparatus according to a third embodiment using correlation characteristics;

FIG. 22A shows a simulation of velocity in a case where, when a pointer is gradually speeding down, the velocity of the pointer drops to a negative velocity just before the velocity reaches zero, and FIG. 22B shows a simulation in which the above phenomenon is corrected;

DETAILED DESCRIPTION

Figure 2:
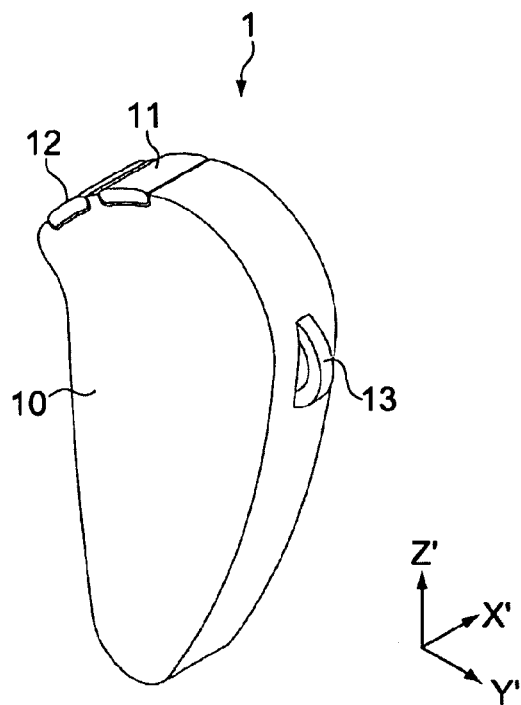
FIG. 2 is a perspective view showing an input apparatus.

Hereinafter, embodiments will be described with reference to the drawings.

FIG. 1 is a diagram showing a control system according to an embodiment. The control system, denoted by reference numeral 100, includes a display apparatus 5, a control apparatus 40, and an input apparatus 1.

FIG. 2 is a perspective view showing the input apparatus 1. The input apparatus 1 is of a size that a user is capable of holding. The input apparatus 1 includes a casing 10 and operation sections. The operation sections are, for example, two buttons 11 and 12 provided on an upper portion of the casing 10, and a rotary wheel button 13. The button 11 is disposed closer to the center of the upper portion of the casing 10 than the button 12 is. The button 11 functions as a left button of a mouse, i.e., an input device for a PC. The button 12 is adjacent to the button 11, and functions as a right button of the mouse.

For example, a "drag and drop" operation may be executed by moving the input apparatus 1 while pressing the button 11. A file may be opened by double-clicking the button 11. Further, the screen 3 may be scrolled with the wheel button 13. Locations of the buttons 11 and 12 and the wheel button 13, a content of a command issued, and the like can arbitrarily be changed.

Figure 3:
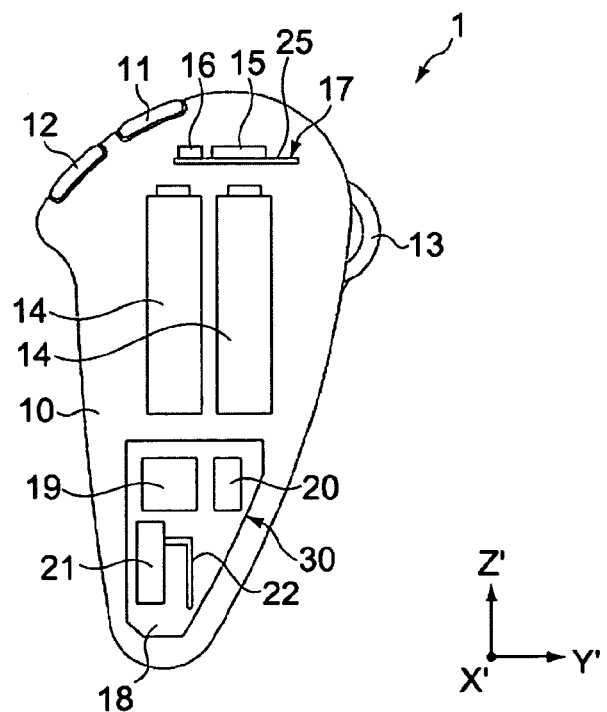
FIG. 3 is a diagram schematically showing an internal structure of the input apparatus.
Figure 4:
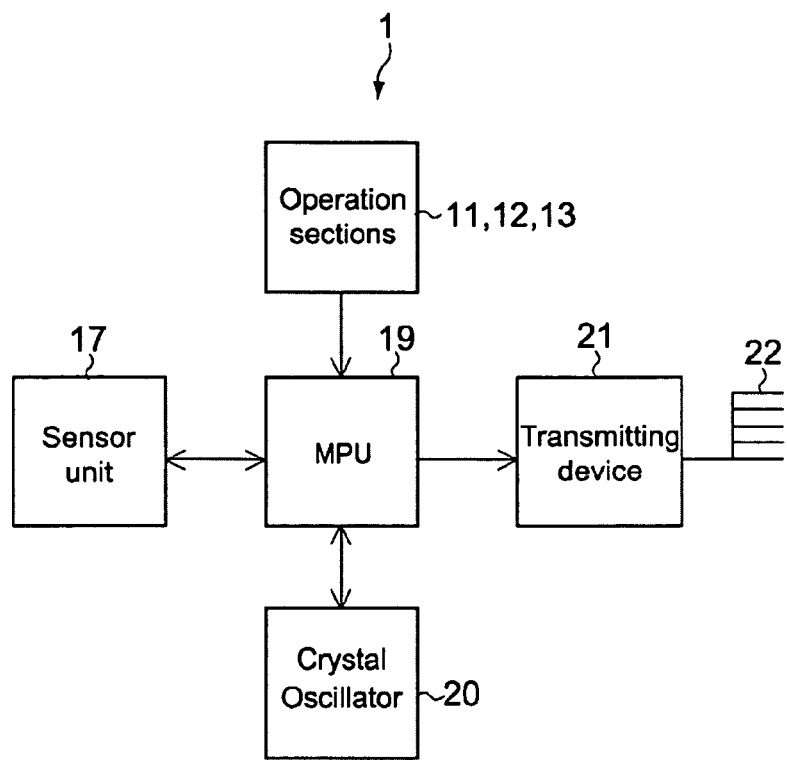
FIG. 4 is a block diagram showing an electrical configuration of the input apparatus.

FIG. 3 is a diagram schematically showing an inner configuration of the input apparatus 1. FIG. 4 is a block diagram showing an electrical configuration of the input apparatus 1.

The input apparatus 1 includes a sensor unit 17, a control unit 30, and batteries 14.

Figure 8:
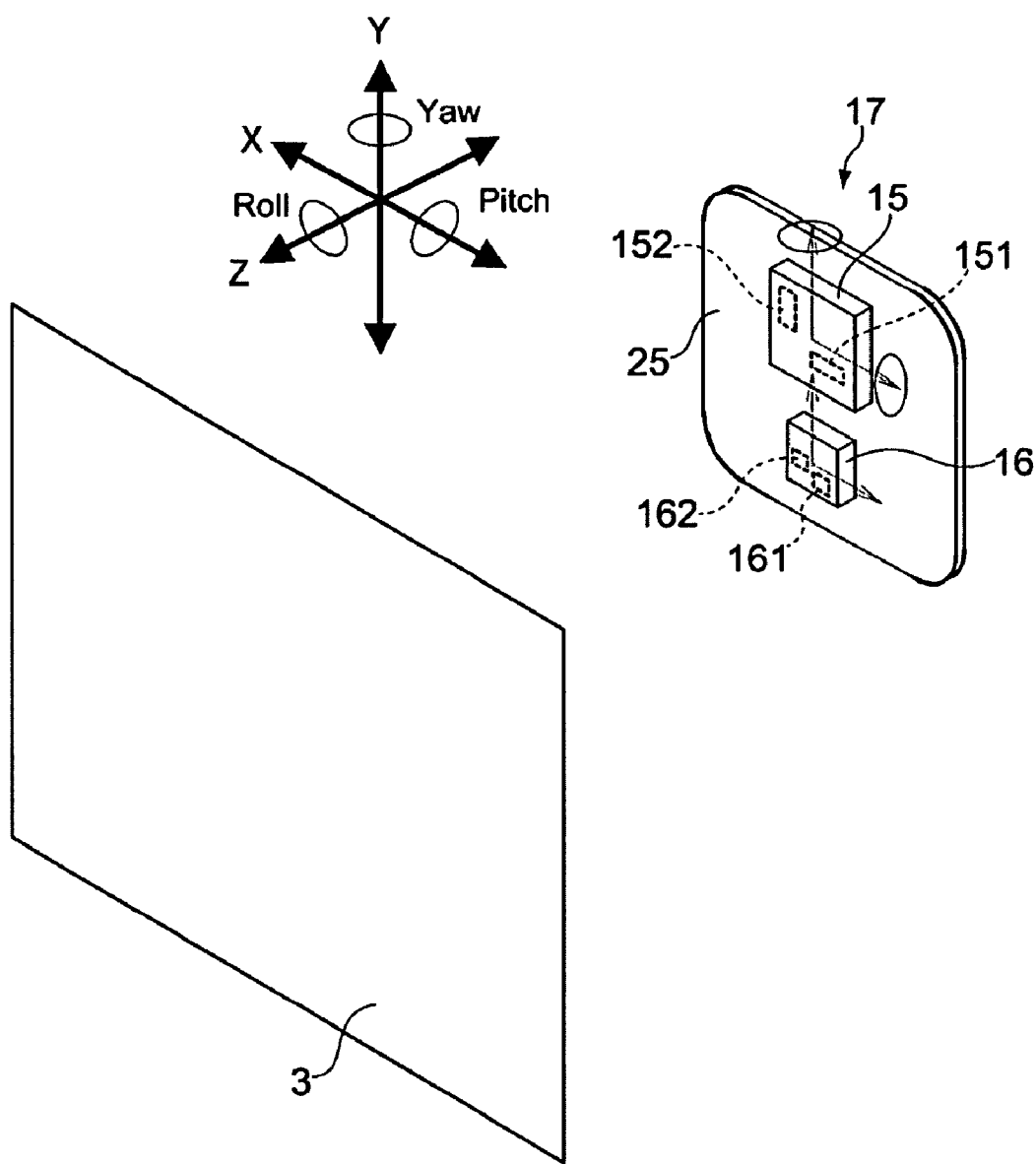
FIG. 8 is a perspective view showing a sensor unit.

FIG. 8 is a perspective view showing the sensor unit 17. The sensor unit 17 includes an acceleration sensor unit 16.

The acceleration sensor unit 16 detects accelerations in different angles, e.g., along two orthogonal axes (X axis and Y axis). That is, the acceleration sensor unit 16 includes two sensors, i.e., a first acceleration sensor 161 and a second acceleration sensor 162. The sensor unit 17 further includes an angular velocity sensor unit 15. The angular velocity sensor unit 15 detects angular accelerations about the two orthogonal axes. That is, the angular velocity sensor unit 15 includes two sensors, i.e., a first angular velocity sensor 151 and a second angular velocity sensor 152. The acceleration sensor unit 16 and the angular velocity sensor unit 15 are respectively packaged and mounted on a circuit board 25.

As each of the first angular velocity sensor 151 and the second angular velocity sensor 152, a vibration gyro sensor detecting Colioris force in proportion with an angular velocity is used. As each of the first acceleration sensor 161 and the second acceleration sensor 162, any sensor such as a piezoresistive sensor, a piezoelectric sensor, or a capacitance sensor may be used.

In the description made with reference to FIGS. 2 and 3, a longitudinal direction of the casing 10 is referred to as Z' direction, a thickness direction of the casing 10 is referred to as X' direction, and a width direction of the casing 10 is referred to as Y' direction, for convenience. In this case, the sensor unit 17 is incorporated into the casing 10 such that a surface of the circuit board 25 on which the acceleration sensor unit 16 and the angular velocity sensor unit 15 are mounted is substantially in parallel with an X'-Y' plane. As described above, the acceleration sensor unit 16 and the angular velocity sensor unit 15 each detect physical amounts with respect to the two axes, i.e., the X axis and the Y axis. It should be noted that, in the following description, a coordinate system that moves with the input apparatus 1, i.e., the coordinate system fixed to the input apparatus 1, is referred to as the X' axis, the Y' axis, and the Z' axis. It should be noted that, in the following description, a geostationary coordinate system on the earth, i.e., the inertial coordinate system, is referred to as the X axis, the Y axis, and the Z axis.

In the following description, with regard to movement of the input apparatus 1, a rotational direction about the X' axis is sometimes referred to as a pitch direction, a rotational direction about the Y' axis is sometimes referred to as a yaw direction, and a rotational direction about the Z' axis is sometimes referred to as a roll direction.

The control unit 30 includes a main substrate 18, an MPU (Micro Processing Unit) 19 (or CPU) mounted on the main substrate 18, a crystal oscillator 20, a transmitting device 21, and an antenna 22 printed on the main substrate 18.

The MPU 19 includes a built-in volatile or nonvolatile memory requisite therefor. To the MPU 19, a detection signal is input from the sensor unit 17, an operation signal is input from the operation sections, and other signals are input. The MPU 19 executes various calculations in order to generate predetermined control signals in response to the above input signals.

The transmitting device 21 transmits control signals (input information) generated in the MPU 19 as RF radio signals to the control apparatus 40 via the antenna 22.

The crystal oscillator 20 generates clocks and supplies the clocks to the MPU 19. As the batteries 14, dry cell batteries, rechargeable batteries, or the like are used.

The control apparatus 40 is a computer, and includes an MPU 35 (or CPU), a RAM 36, a ROM 37, a video RAM 41, an antenna 39, and a receiver device 38.

The receiver device 38 receives the control signal transmitted from the input apparatus 1 via the antenna 39. The MPU 35 analyses the control signal and executes various calculations. As a result, a display control signal controlling a UI displayed on the screen 3 of the display apparatus 5 is generated. The video RAM 41 stores screen data displayed on the display apparatus 5 generated in response to the display control signal.

The control apparatus 40 may be an apparatus dedicated to the input apparatus 1, or may be a PC or the like. The control apparatus 40 is not limited to the PC, and may be a computer integrally formed with the display apparatus 5, an audio/visual device, a projector, a game device, a car navigation device, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
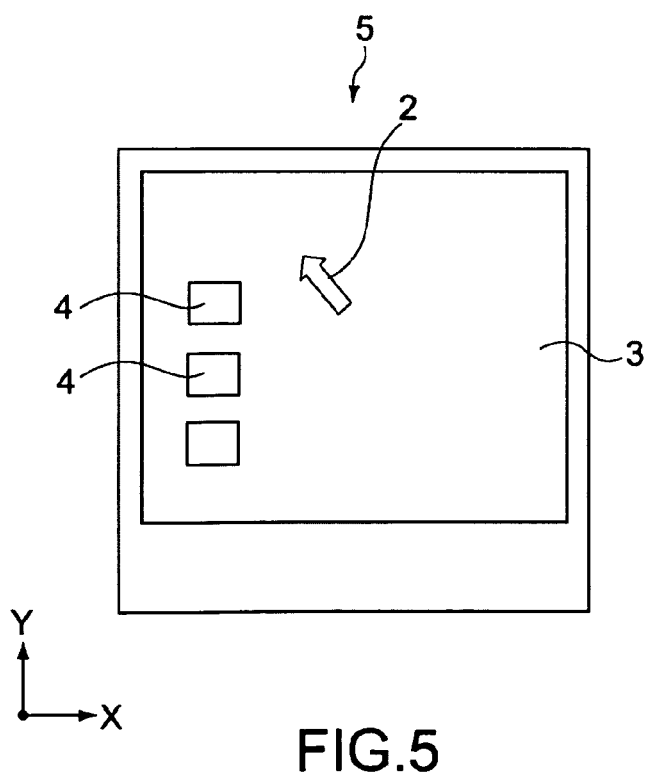
FIG. 5 is a diagram showing an example of a screen displayed on a display apparatus.

FIG. 5 is a diagram showing an example of the screen 3 displayed on the display apparatus 5. On the screen 3, UIs such as icons 4 and a pointer 2 are displayed. The icons are images on the screen 3 representing functions of programs, execution commands, file contents, and the like of the computer. It should be noted that, in the screen 3, the horizontal direction is referred to as the X-axis direction and the vertical direction is referred to as the Y-axis direction. In the following description, in order to facilitate understanding, an operation-target UI to be operated by the input apparatus 1 is assumed to be the pointer 2 (so-called cursor), except when specified otherwise.

Figure 6:
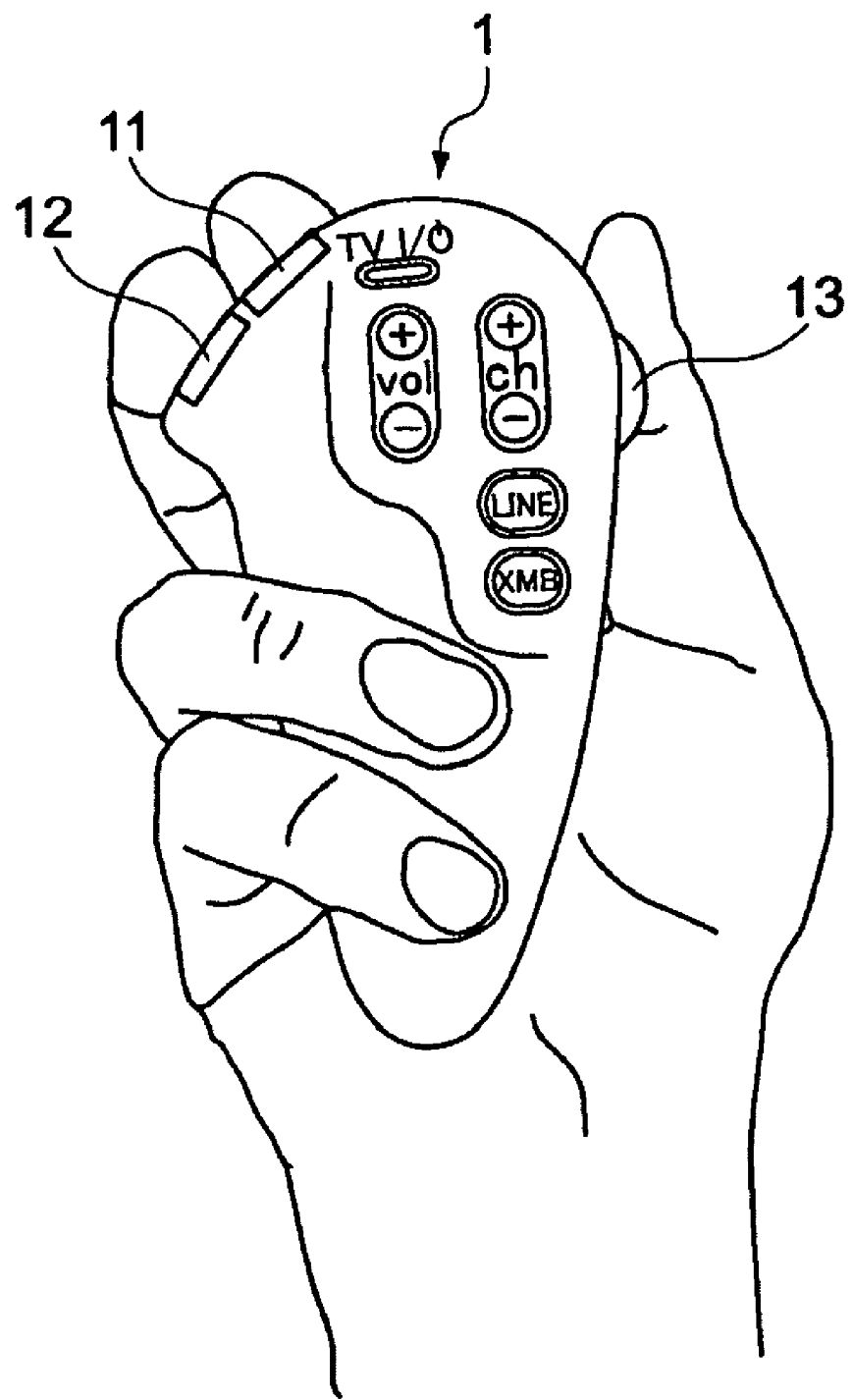
FIG. 6 is a diagram showing a state where a user is holding the input apparatus.

FIG. 6 is a diagram showing a state where a user is holding the input apparatus 1. As shown in FIG. 6, the input apparatus 1 may include operation sections including, in addition to the buttons 11 and 12 and the wheel button 13, various operation buttons such as those provided to a remote controller for operating a television or the like and a power switch, for example. When the user moves the input apparatus 1 in the air or operates the operation sections while holding the input apparatus 1 as shown in the figure, the input information is output to the control apparatus 40, and the control apparatus 40 controls the UI.

Figure 7A:
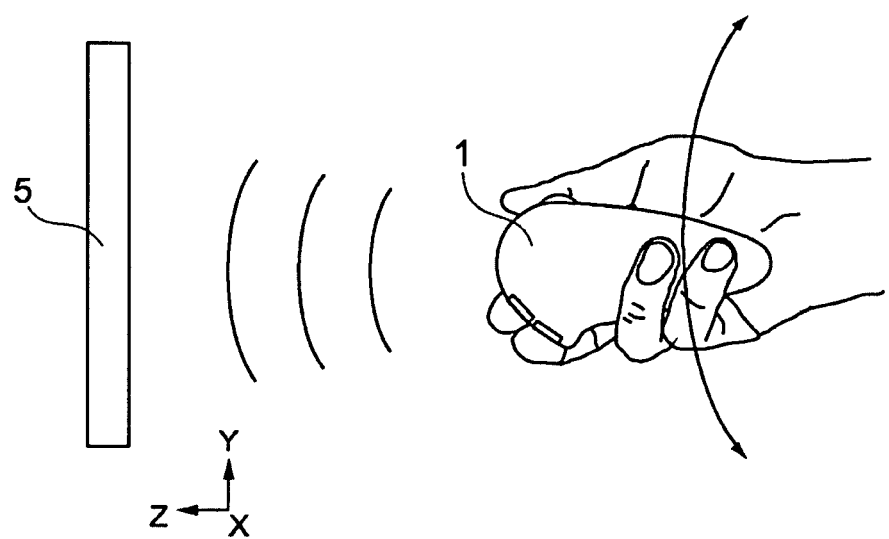
FIG. 7 are explanatory views showing typical examples of how a user moves the input apparatus to move a pointer on a screen.
Figure 7B:
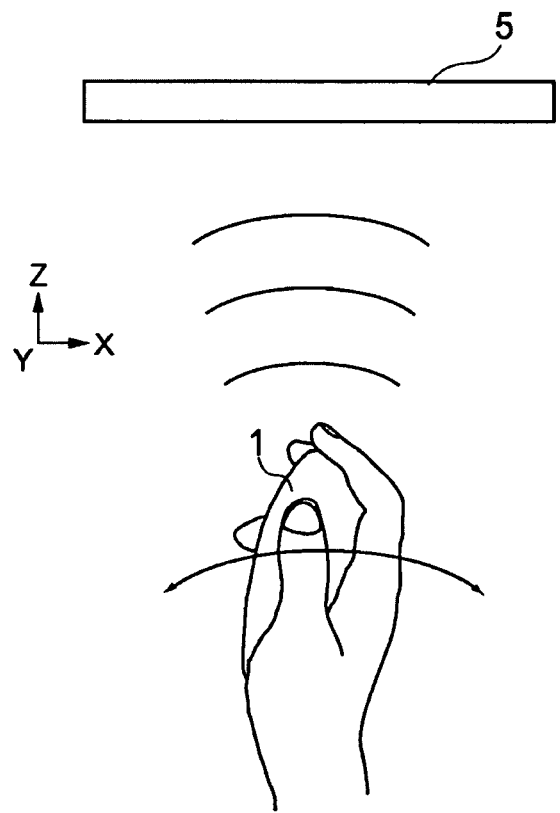

Subsequently, typical examples of the movement of the input apparatus 1 and movement of the pointer 2 on the screen 3 in response thereto are described. FIGS. 7A and 7B are explanatory diagrams therefor.

As shown in FIGS. 7A and 7B, the user holds the input apparatus 1 so as to aim the buttons 11 and 12 side of the input apparatus 1 at the display apparatus 5 side. The user holds the input apparatus 1 such that a thumb is located on an upper side and a little finger is located on a lower side as in handshakes. In this state, the circuit board 25 (see FIG. 8) of the sensor unit 17 is substantially in parallel with the screen 3 of the display apparatus 5. Herein, the two axes being detection axes of the sensor unit 17 correspond to the horizontal axis (X axis) and the vertical axis (Y axis) on the screen 3, respectively. Hereinafter, the posture of the input apparatus 1 as shown in FIGS. 7A and 7B is referred to as reference posture.

As shown in FIG. 7A, when the input apparatus 1 is in the reference posture, the user swings a wrist or an arm in the vertical direction, i.e., in the pitch direction. In this case, the second acceleration sensor 162 detects an acceleration value (second acceleration value) in the Y-axis direction. The first angular velocity sensor 151 detects an angular velocity value (first angular velocity value) about the X axis. Based on the detection values, the control apparatus 40 controls the display of the pointer 2 such that the pointer 2 moves in the Y-axis direction.

Meanwhile, as shown in FIG. 7B, when the input apparatus 1 is in the reference posture, the user swings the wrist or the arm in the horizontal direction, i.e., the yaw direction. In this case, the first acceleration sensor 161 detects an acceleration value (first acceleration value) in the X-axis direction. The second angular velocity sensor 152 detects an angular velocity value (second angular velocity value) about the Y axis. Based on the detection values, the control apparatus 40 controls the display of the pointer 2 such that the pointer 2 moves in the X-axis direction.

In one embodiment, the MPU 19 of the input apparatus 1 calculates, based on the detection values detected by the sensor unit 17, velocity values in the yaw direction and the pitch direction in accordance with a program stored in the built-in nonvolatile memory, which will be described later in detail. In this case, the MPU 19 of the input apparatus 1 mainly functions as velocity information output means. Herein, in order to control the movement of the pointer 2, a dimension of an integral value (velocity) of the biaxial acceleration values detected by the acceleration sensor unit 16 is generally used. Further, input information of the dimension of the velocity is transmitted to the control apparatus 40.

In another embodiment, the physical amount detected by the sensor unit 17 of the input apparatus 1 is transmitted to the control apparatus 40 as the input information. In this case, the MPU 35 of the control apparatus 40 calculates, based on the received input information, the velocity values in the yaw direction and the pitch direction in accordance with a program stored in the ROM 37. The MPU 35 displays the pointer 2 such that the pointer 2 moves in accordance with the velocity values (see FIG. 14).

The control apparatus 40 converts displacement in the yaw direction per unit time to a displacement amount of the pointer 2 in the X-axis direction on the screen 3, and converts displacement in the pitch direction per unit time to a displacement amount of the pointer 2 in the Y-axis direction on the screen 3, to thereby move the pointer 2. Typically, with regard to velocity values supplied every predetermined number of clocks, the MPU 35 of the control apparatus 40 adds an n-th supplied velocity value to an (n−1)th supplied velocity value. That is, the n-th supplied velocity value corresponds to the displacement value of the pointer 2, and coordinate information of the pointer 2 on the screen 3 is generated. In this case, the MPU 35 of the control apparatus 40 mainly functions as coordinate information generation means.

When calculating the velocity values, integral of the acceleration values is executed similar to the displacement amount calculation method.

Figures 10A, 10B, 10C:
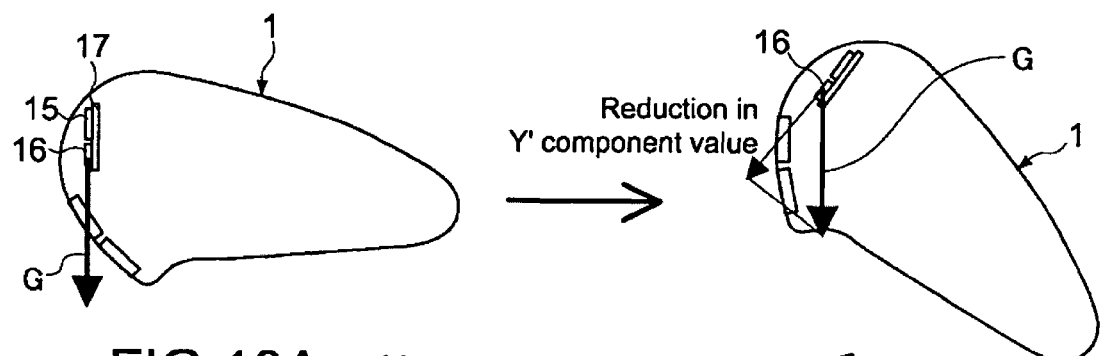
FIG. 10 are diagrams for illustrating another example of the gravity effect with respect to the acceleration sensor unit.

Subsequently, a gravity effect with respect to the acceleration sensor unit 16 will be described. FIGS. 9 and 10 are explanatory diagrams therefor. FIGS. 9A to 9C are diagrams each showing the input apparatus 1 shown in the Z direction. FIGS. 10A to 10C are diagrams each showing the input apparatus 1 shown in the X direction.

FIG. 9A shows the input apparatus 1 held still in the reference posture. In this case, the output of the first acceleration sensor 161 is substantially zero. The output of the second acceleration sensor 162 corresponds to a gravity acceleration G. However, for example, in a case where the input apparatus 1 is inclined in the roll direction as shown in FIG. 9B, the first acceleration sensor 161 and the second acceleration sensor 162 respectively detect acceleration values of inclination components of the gravity acceleration G.

Specifically, in this case, even though the input apparatus 1 does not actually move in the X-axis direction, the first acceleration sensor 161 detects the acceleration in the X-axis direction. The state of FIG. 9B is considered to be the same as a state of FIG. 9C in which, when the input apparatus 1 is in the reference posture, inertial forces Ix and Iy as indicated by the dotted arrows are applied to the acceleration sensor unit 16. The acceleration sensor unit 16 cannot distinguish the state of FIG. 9B from the state of FIG. 9C. As a result, the acceleration sensor unit 16 determines that acceleration in a lower left-hand direction as indicated by the arrow F is applied to the input apparatus 1, to thereby output a detection signal which does not correspond to the actual movement of the input apparatus 1. Further, the gravity acceleration G is constantly applied to the acceleration sensor unit 16, thereby increasing the integral value and causing an accelerated increase in a displacement amount of the pointer 2 in the lower left-hand direction. When the input apparatus 1 in the state of FIG. 9A is moved to the state of FIG. 9B, the pointer 2 is supposed to stand still on the screen 3, which is an intuitive operation of the user.

The same can be applied to a case where the input apparatus 1 in the reference posture as shown in FIG. 10A is rotated and inclined in the pitch direction as shown in FIG. 10B, for example. In this case, the gravity acceleration G detected by the second acceleration sensor 162 when the input apparatus 1 is in the reference posture reduces, so it appears that the inertial force I in the upper pitch direction is applied to the input apparatus 1 as shown in FIG. 10C.

Figure 11:
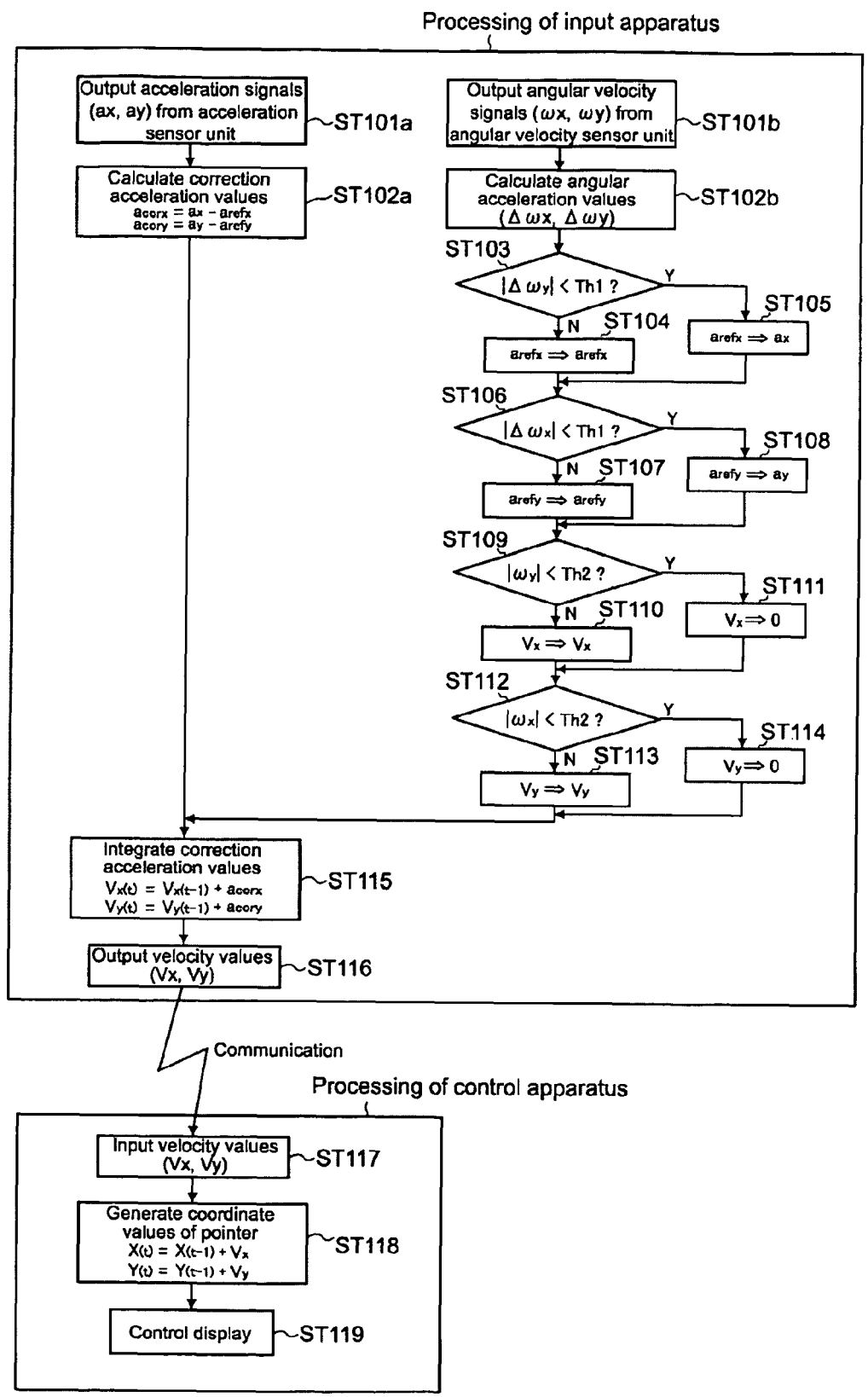
FIG. 11 is a flowchart showing an operation performed when calculating velocity values of the input apparatus based on angular velocity values detected by an angular velocity sensor unit.

In order to reduce the above-mentioned gravity effect with respect to the acceleration sensor unit 16 as much as possible, in the input apparatus 1 according to this embodiment, the velocity values of the input apparatus 1 are calculated by using the angular velocity values detected by the angular velocity sensor unit 15. Hereinafter, operations therefor will be described. FIG. 11 is a flowchart showing the operations.

The input apparatus 1 is powered on. For example, a power switch or the like provided to the input apparatus 1 or the control apparatus 40 is turned on, to thereby power on the input apparatus 1. Upon powering on, the acceleration sensor unit 16 outputs acceleration signals (first and second acceleration values $a_x$, $a_y$) in the two axes (Step 101a), and the signals are supplied to the MPU 19. The acceleration signals are signals corresponding to a posture (initial posture) of the input apparatus 1 at a time when the input apparatus 1 is powered on.

The initial posture may be the reference posture described above. However, the initial posture may be a posture in which the gravity acceleration is detected only in the X direction, i.e., a state where the output of the first acceleration sensor 161 corresponds to the detected acceleration value of the gravity acceleration and the output of the second acceleration sensor 162 is zero. As a matter of course, the initial posture may be the inclined posture as shown in FIG. 9B.

The MPU 19 of the input apparatus 1 obtains the acceleration signals ($a_x$, $a_y$) from the acceleration sensor unit 16 every predetermined number of clocks. When receiving the second acceleration signals ($a_x$, $a_y$) and acceleration signals thereafter, the MPU 19 executes the following calculations in order to remove the gravity effect. That is, as expressed in Equations (1) and (2) below, the MPU 19 subtracts, from the present acceleration values ($a_x$, $a_y$), previous gravity acceleration components (first $a_x$ ($=a_{refx}$), first $a_y$ ($=a_{refy}$)) detected in the X- and Y-axis directions, respectively, to generate a first correction acceleration value $a_{corx}$ and a second correction acceleration value $a_{cory}$ (Step 102a).

$$a_{corx} = a_x - a_{refx} \tag{1}$$

$$a_{cory} = a_y - a_{refy} \tag{2}$$

Hereinafter, $a_{refx}$ and $a_{refy}$ will be referred to as a reference acceleration value in the X-axis direction (first reference acceleration value) and a reference acceleration value in the Y-axis direction (second reference acceleration value), respectively. In a case where the calculations of Step 102a are performed for the first time after powering on, the acceleration signals $a_x$, $a_y$ detected just after powering on are used as $a_{refx}$, $a_{refy}$.

As expressed in Equations (3) and (4), the MPU 19 repeatedly adds the first and second correction acceleration values $a_{corx}$, $a_{cory}$, respectively, that is, executes integral operations, to thereby calculate a first velocity value $V_x$ and a second velocity value $V_y$ (Step 115).

$$V_x(t) = V_x(t-1) + a_{corx} \quad (3)$$

$$V_y(t) = V_y(t-1) + a_{cory} \quad (4)$$

in which $V_x(t)$, $V_y(t)$ represent present velocity values, and $V_x(t-1)$, $V_y(t-1)$ represent previous velocity values.

Meanwhile, as described above, when the input apparatus 1 is powered on, the angular velocity sensor unit 15 outputs the angular velocity signals (first and second angular velocity values $\omega_x$, $\omega_y$) about the two axes (Step 101b), which are then supplied to the MPU 19. When the MPU 19 obtains those angular velocity signals, the MPU 19 executes differential operations to calculate angular acceleration values thereof (first angular acceleration value $\Delta\omega_x$ and second angular acceleration value $\Delta\omega_y$) (Step 102b).

The MPU 19 judges whether absolute values $|\Delta\omega_y|$, $|\Delta\omega_x|$ of $\Delta\omega_y$, $\Delta\omega_x$ are smaller than a threshold value Th1 (Step 103, Step 106). In a case where $|\Delta\omega_y| \geq$ Th1 is established, the MPU 19 uses the first reference acceleration value $a_{refx}$ as it is and does not execute updating (Step 104). Similarly, in a case where $|\Delta\omega_x| \geq$ Th1 is established, the MPU 19 uses the second reference acceleration value $a_{refy}$ as it is and does not execute updating (Step 107).

A numerical value close to zero is set as the threshold value Th1. The threshold value Th1 is provided in view of an angular velocity value unintentionally detected due to a shake of a user's hand, a DC offset, and the like when the user is consciously holding the input apparatus 1 still. With the provision, the pointer 2 can be prevented from being movingly displayed due to a shake of a hand or a DC offset when the user is consciously holding the input apparatus 1 still.

The above processing is executed because of the following reason.

Figure 12:
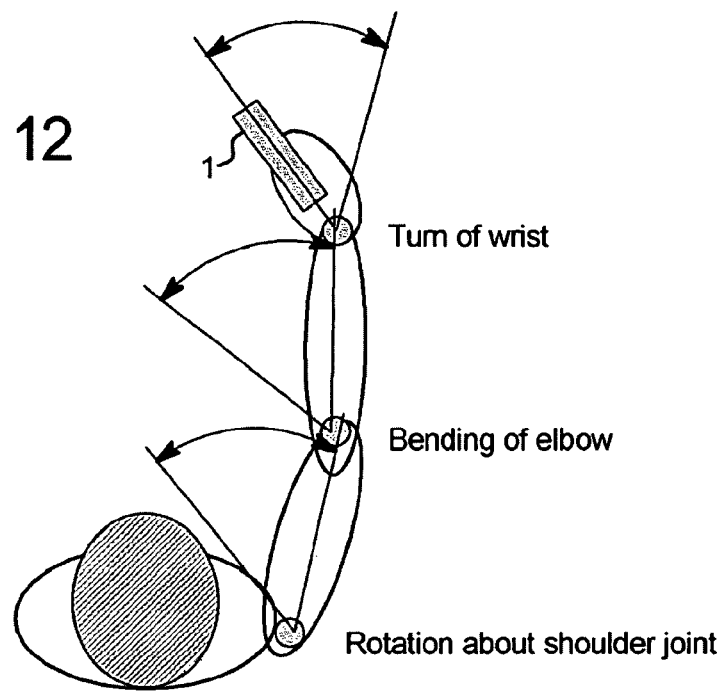
FIG. 12 is a top view of a user operating the input apparatus.

FIG. 12 is a top view of a user operating the input apparatus 1. In a normal way, the user operates the input apparatus 1 with at least one of a rotation about a base of an arm, bending of an elbow, and a turn of a wrist. So, it is considered that when acceleration is generated, angular acceleration is also generated. That is, it can be understood that the acceleration depends on the angular acceleration in the same direction. Thus, the MPU 19 can judge, by monitoring the absolute value $|\Delta\omega_y|$ of the second angular acceleration value, whether to update the first reference acceleration value $a_{refx}$ in the same direction, and can accordingly judge whether to calibrate the first correction acceleration value $a_{corx}$ from Equation (1). The absolute value $|\Delta\omega_x|$ of the first angular acceleration value is treated in the same manner.

More specifically, in the case where the absolute value $|\Delta\omega_y|$ of the second angular acceleration value is equal to or larger than the threshold value Th1, the MPU 19 judges that the input apparatus 1 is moved in the yaw direction. In this case, the MPU 19 does not update the first reference acceleration value $a_{refx}$, and eventually, does not calibrate the first correction acceleration value $a_{corx}$ and continues the integral operation of Equation (3) based on the above $a_{corx}$.

Further, in the case where the absolute value $|\Delta\omega_x|$ of the first angular acceleration value is equal to or larger than the threshold value Th1, the MPU 19 judges that the input apparatus 1 is moved in the pitch direction. In this case, the MPU 19 does not update the second reference acceleration value $a_{refy}$, and eventually, does not calibrate the second correction acceleration value $a_{cory}$ and continues the integral operation of Equation (4) based on the above $a_{cory}$.

Meanwhile, when it is judged in Step 103 that the absolute value $|\Delta\omega_y|$ of the second angular acceleration value is smaller than the threshold value Th1, the MPU 19 judges that the input apparatus 1 is not moved in the yaw direction. In this case, the MPU 19 updates the first reference acceleration value $a_{refx}$ to the present (latest) detected value $a_x$, to thereby calibrate the first correction acceleration value $a_{corx}$ based on Equation (1) (Step 105). The latest detected value $a_x$ is a detected value obtained in a state where the input apparatus 1 remains substantially stationary, so the value is a component value of the gravity acceleration.

Similarly, when it is judged in Step 106 that the absolute value $|\Delta\omega_x|$ of the first angular acceleration value is smaller than the threshold value Th1, the MPU 19 judges that the input apparatus 1 is not moved in the pitch direction. In this case, the MPU 19 updates the second reference acceleration value $a_{refy}$ to the present (latest) detected value $a_y$, to thereby calibrate the second correction acceleration value $a_{cory}$ based on Equation (2) (Step 108).

It should be noted that in an embodiment, the same threshold value Th1 is used in both the yaw direction and the pitch direction. Alternatively, different threshold values may be used in those two directions.

The angular acceleration values $\Delta\omega_x$, $\Delta\omega_y$ are monitored in the above description. The MPU 19 may further monitor the angular velocity values $\omega_x$, $\omega_y$ to correct the velocity values calculated based on Equations (3) and (4). When velocity is generated, it is understood that angular velocity is also generated in view of the above idea of FIG. 12. Further, it is considered that velocity depends on angular velocity in the same direction.

Specifically, in a case where the absolute value $|\omega_y|$ of the second angular velocity value is equal to or larger than a threshold value Th2 (No in Step 109), the MPU 19 judges that the input apparatus 1 is moved in the yaw direction. In this case, the MPU 19 does not correct the first velocity value $V_x$ (Step 110). The absolute value $|\omega_x|$ of the first angular velocity value is treated in the same manner (No in Step 112, Step 113).

The threshold value Th2 may be set similarly to the setting of the threshold value Th1.

Meanwhile, in a case where the absolute value $|\omega_y|$ of the second angular velocity value is smaller than the threshold value Th2 (Yes in Step 109), the MPU 19 judges that the input apparatus 1 is not moved in the yaw direction. In this case, the MPU 19 corrects the first velocity value $V_x$, e.g., resets the first velocity value $V_x$ to zero (Step 111). The absolute value $|\omega_x|$ of the first angular velocity value is treated in the same manner (Yes in Step 112, Step 114).

As described above, the MPU 19 outputs the velocity values $V_x$, $V_y$ in the two directions, and the transmitting device 21 outputs input information on those velocity values to the control apparatus 40 (Step 116).

The MPU 35 of the control apparatus 40 inputs therein the velocity values $V_x$, $V_y$ as the input information (Step 117). The MPU 35 generates coordinate values X, Y of the pointer 2 based on the velocity values $V_x$, $V_y$ as expressed in Equations (5) and (6) below (Step 118), and performs control to move the pointer 2 displayed on the screen 3 (Step 119).

$$X(t) = X(t-1) + V_x \quad (5)$$

$$Y(t) = Y(t-1) + V_y \quad (6)$$

As described above, when the input apparatus 1 remains substantially stationary, the reference acceleration values $a_{refx}$, $a_{refy}$ are updated and the correction acceleration values $a_{corx}$, $a_{cory}$ are calibrated. The gravity effect with respect to the acceleration sensor unit 16 can thus be reduced. Further, when the reference acceleration values $a_{refx}$, $a_{refy}$ are updated, the correction acceleration values $a_{corx}$, $a_{cory}$ are corrected based on Equations (1) and (2), so a DC level is corrected and a problem of the DC offset is addressed. Further, when the input apparatus 1 remains substantially stationary, correction is performed such that the velocity values are reset to zero, so an integral error can be reduced. In a case where the integral error is generated, the pointer 2 moves on the screen 3 even though a user has stopped moving the input apparatus 1.

Figure 13:
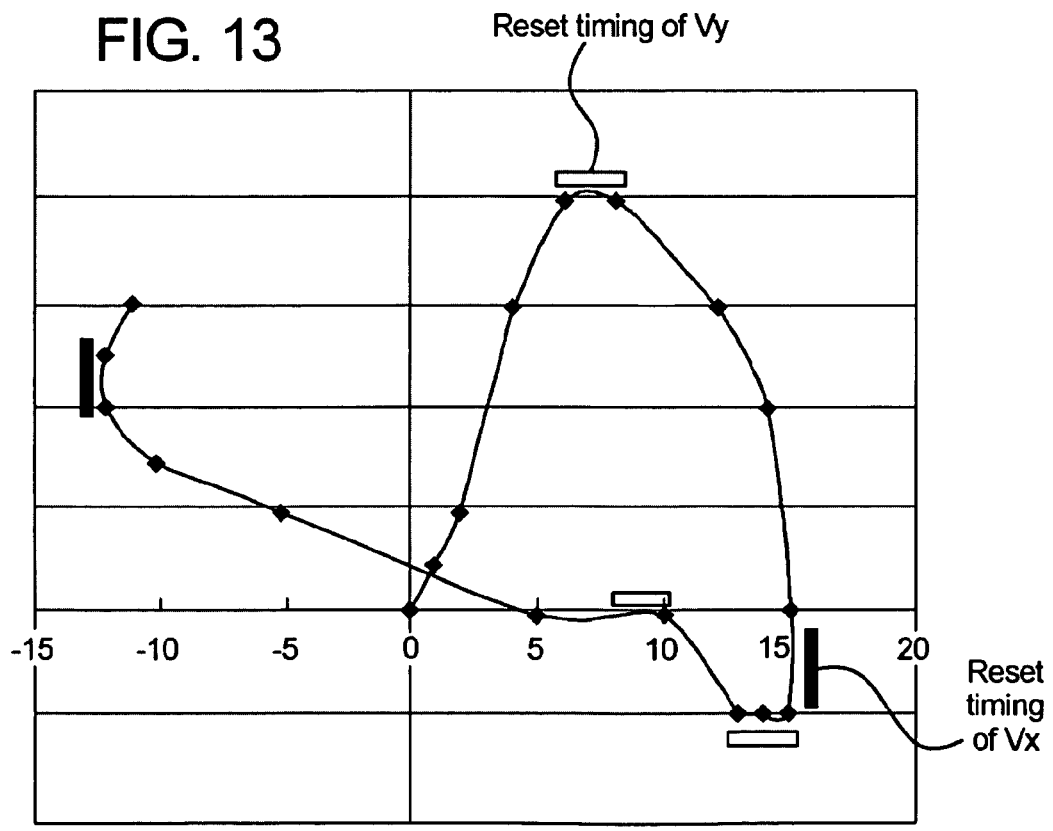
FIG. 13 is a diagram showing an example of a trajectory of the input apparatus on a plane formed by an X axis and a Y axis.

Further, in an embodiment, the first reference acceleration value $a_{refx}$ and the second reference acceleration value $a_{refy}$ are individually updated. So in a case where the angular acceleration value in only one of the yaw direction and the pitch direction is smaller than the threshold value, the angular acceleration value concerned is calibrated. Accordingly, the first reference acceleration value $a_{refx}$ or the second reference acceleration value $a_{refy}$ can be updated at time intervals practically short enough. Further, the first velocity value $V_x$ and the second velocity value $V_y$ are individually updated, providing the same effect as that described above. FIG. 13 is a diagram for illustrating the above for clear understanding.

FIG. 13 shows a trajectory of the input apparatus 1 on a plane formed by the X axis and the Y axis. In a case where the angular velocity value $\omega_y$ in the yaw direction is substantially zero (smaller than the threshold value Th2), $V_x$ is reset to zero. In a case where the angular velocity value $\omega_x$ in the pitch direction is substantially zero (smaller than the threshold value Th2), $V_y$ is reset to zero.

In the past, in order to reduce the gravity effect, there have been provided an input device including six sensors, and an apparatus that detects a gravity vector change per unit time using triaxial acceleration sensors to recognize angular velocities in the roll and pitch directions as XY displacement amounts. This apparatus has no problem concerning movement in the Y direction. However, movement of the pointer in the X direction depends merely on a turn or twist of the wrist of a user in the roll direction, which does not match an intuitive operation of the user.

Figure 14:
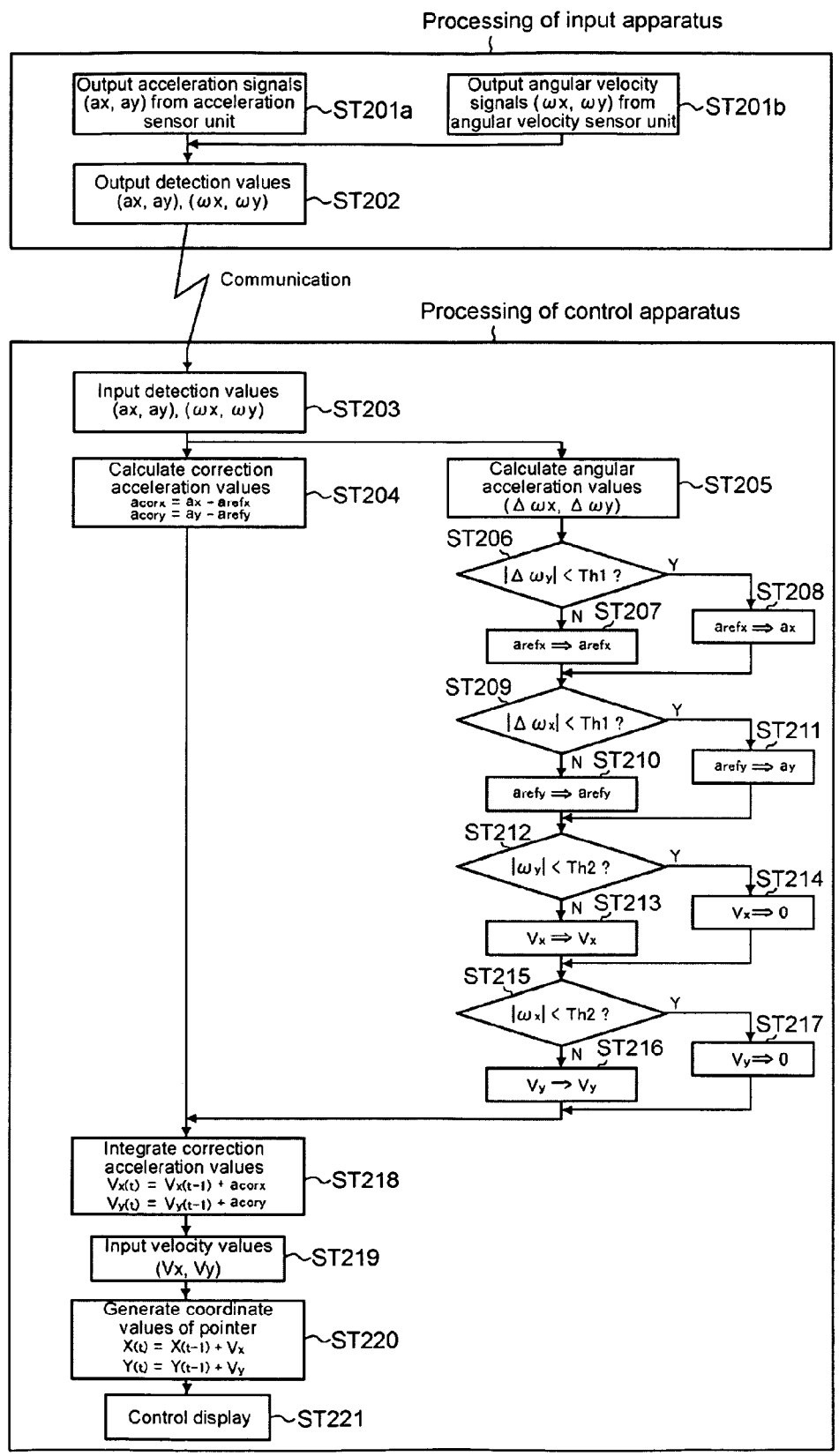
FIG. 14 is a flowchart showing another embodiment.

FIG. 14 is a flowchart showing another embodiment. In this flowchart, the input apparatus 1 outputs the biaxial acceleration signals and the angular velocity signals about the two axes output from the sensor unit 17 to the control apparatus 40 as input information. The MPU 35 of the control apparatus 40 executes Steps 102a and 102b to 115 shown in FIG. 11 as Steps 204 to 218. Detailed description of processing of this embodiment will be omitted because it is similar to the processing of FIG. 11.

Similarly, in the processing shown in FIGS. 18 to 21 below, the control apparatus may alternatively execute processing up to calculating velocity values.

Subsequently, other embodiments will be described. In the embodiments described below, correlation characteristics of the acceleration and the angular acceleration are used to reduce the effect of gravity acceleration with respect to the input apparatus due to the pitch and roll rotations thereof.

FIG. 15A is a graph illustrating a simulation of the angular velocity signal. FIG. 15B is a graph illustrating a simulation of the angular acceleration signal. FIG. 15C is a graph illustrating a simulation of the acceleration signal. FIG. 15D is a graph illustrating a simulation of the velocity signal. In each graph, the abscissa axis represents time. The graphs of FIGS. 15A and 15D are similar to each other and correlates with each other. Similarly, the graphs of FIGS. 15B and 15C are similar to each other and correlates with each other. In the following embodiments, the correlations are used.

Each embodiment using the correlation characteristics may be executed in addition to executing the flow of Steps 104 to 116 of FIG. 11, or may be executed without executing the flow. In the following embodiments, description will be made assuming the latter case.

(First Embodiment Using Correlation Characteristics)

According to a first embodiment using the correlation characteristics, a correlation coefficient $R^2$ of the correction acceleration values ($a_{corx}$, $a_{cory}$) (or the acceleration values ($a_x$, $a_y$)) and the angular acceleration values ($\Delta\omega_x$, $\Delta\omega_y$) is used to calculate the velocity values. ($a_{corx}$, $a_{cory}$) have the same physical amounts as ($a_x$, $a_y$), so in the following embodiments, ($a_{corx}$, $a_{cory}$) are used. Further, calculation on the X axis is the same as calculation on the Y axis, so, hereinafter, description will be made on the correction acceleration value $a_{corx}$ on the X axis.

Figure 18:
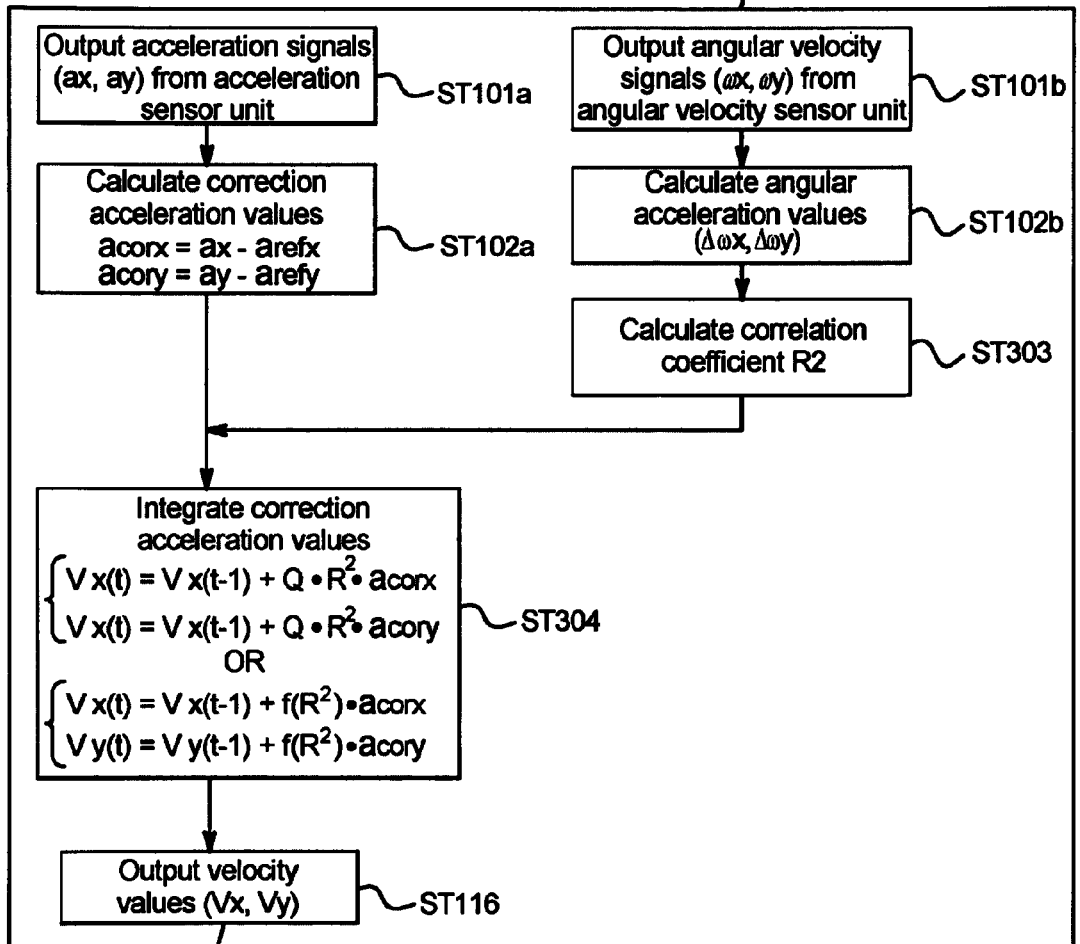
FIG. 18 is a flowchart showing an operation of an input apparatus according to a first embodiment using correlation characteristics.

FIG. 18 is a flowchart of the operation of the input apparatus using the correlation coefficient $R^2$. It should be noted that description will mainly be made on operation different from the flow of FIG. 11.

Each of FIGS. 16A, 16C, 16E, 17A, and 17C is a graph of a simulation showing the velocity of the pointer in a case where the input apparatus moves at a constant linear velocity and at an inconstant angular velocity. The abscissa axis represents time. The parameter is angular velocity. In each of FIGS. 16A, 16C, 16E, 17A, and 17C, the bold line a represents an intended velocity. The intended velocity refers to an ideal velocity line with which the highest correlation can be obtained between the velocity and the angular velocity.

Figure 16A:
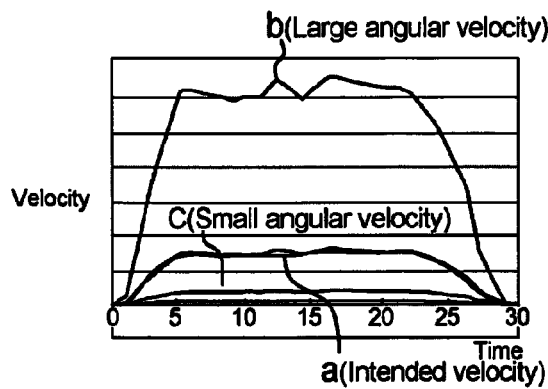
FIG. 16 are graphs each showing a simulation of a velocity of a pointer under different angular velocity or different acceleration.

As shown in FIG. 16A, even though a user moves the input apparatus at a constant velocity, as the correlation between the velocity and the angular velocity weakens, the signals deviate from the intended line a, and the user obtains unintuitive operational feelings. In FIG. 16A, the line b is mainly obtained by the turn of the wrist, and an angular velocity larger than the intended velocity is detected. The line c is mainly obtained by a rotation about the base of an arm, and an angular velocity smaller than the intended velocity is detected.

Figure 16B:
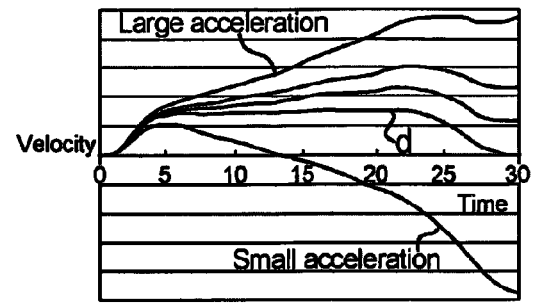

Further, each of FIGS. 16B, 16D, 16F, 17B, and 17D is a graph of a simulation showing the velocity of the pointer in a case where the input apparatus is affected by various gravity components. The parameter is acceleration. In FIG. 16B, as the input apparatus is more affected by the gravity, the correlation between $a_{corx}$ and $\Delta\omega_y$ weakens, and each signal deviate from an intended line (bold line; intended velocity) d. The intended line represents an ideal line of the acceleration having the highest correlation with the angular acceleration without any effect by the gravity.

In the first embodiment, for example, Equation (7) below is used to obtain $R^2$ (Step 303).

$$R^2 = [\Sigma(\Delta\omega_{yi} - m_{\Delta\omega_y} \cdot \Delta\omega_y)(a_{corxi} - m_{a_{corx}})]^2 / [\Sigma(\Delta\omega_{yi} - m_{\Delta\omega_y} \cdot \Delta\omega_y)^2 \cdot \Sigma(a_{corxi} - ma_{corx})^2] \quad (7)$$

in which $m_{\Delta\omega_y}$, $m_{a_{corx}}$ are average amounts of $\Delta\omega_y$, $a_{corx}$, respectively. $\Delta\omega_y$, $a_{corx}$ substituted in Equation (7) are several to several tens of past samples, the present point being an origin.

Subsequently, as expressed in Equations (8) and (9) below, the MPU multiplies the weight coefficient (correlation coefficient) $R^2$ or a weight function $f(R^2)$ corresponding to $R^2$ by $a_{corx}$, to thereby calculate $V_x$ (Step 304).

$$V_x(t) = V_x(t-1) + Q \cdot R^2 \cdot a_{corx} \quad (8)$$

Q: constant or $$V_x(t) = V_x(t-1) + f(R^2) \cdot a_{corx} \quad (9)$$

in which $f(R^2)$ is basically a monotonically increasing function.

Figure 16C:
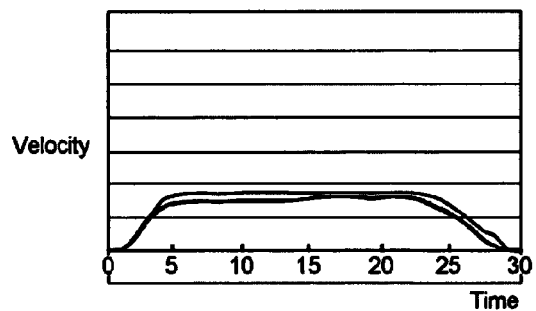
Figure 16D:
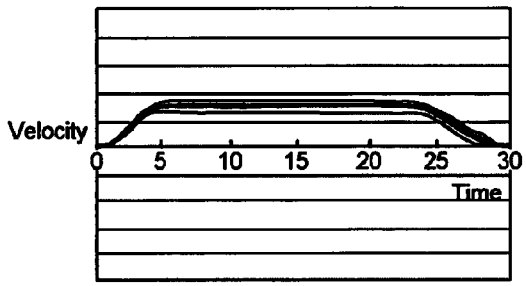

FIGS. 16C and 16D are graphs each showing a simulation of a velocity of the pointer when Equation (7) is used. All lines are substantially ideal.

Alternatively, in another method, in a case where $R^2$ is smaller than the threshold value, the MPU (1) omits the integral operation and (2) sets the acceleration value $a_x$ obtained at that time as the reference acceleration value $a_{refx}$ (i.e., $a_{refx} \rightarrow a_x$).

It should be noted that in FIGS. 15A to 15D, with regard to $a_{corx}$, $\Delta\omega_y$, $R^2 = 0.87$ is applied, and with regard to $V_x$, $\omega_y$, $R^2 = 0.99$ is applied.

In the first embodiment, description has been made in view of the acceleration value (correction acceleration value). Also, since, as shown in FIGS. 15A and 15D, the angular velocity is similar to the velocity, the MPU may calculate the velocity value by using the similar correlation coefficient as to the angular velocity and the velocity.

(Second Embodiment Using Correlation Characteristics)

Figure 19:
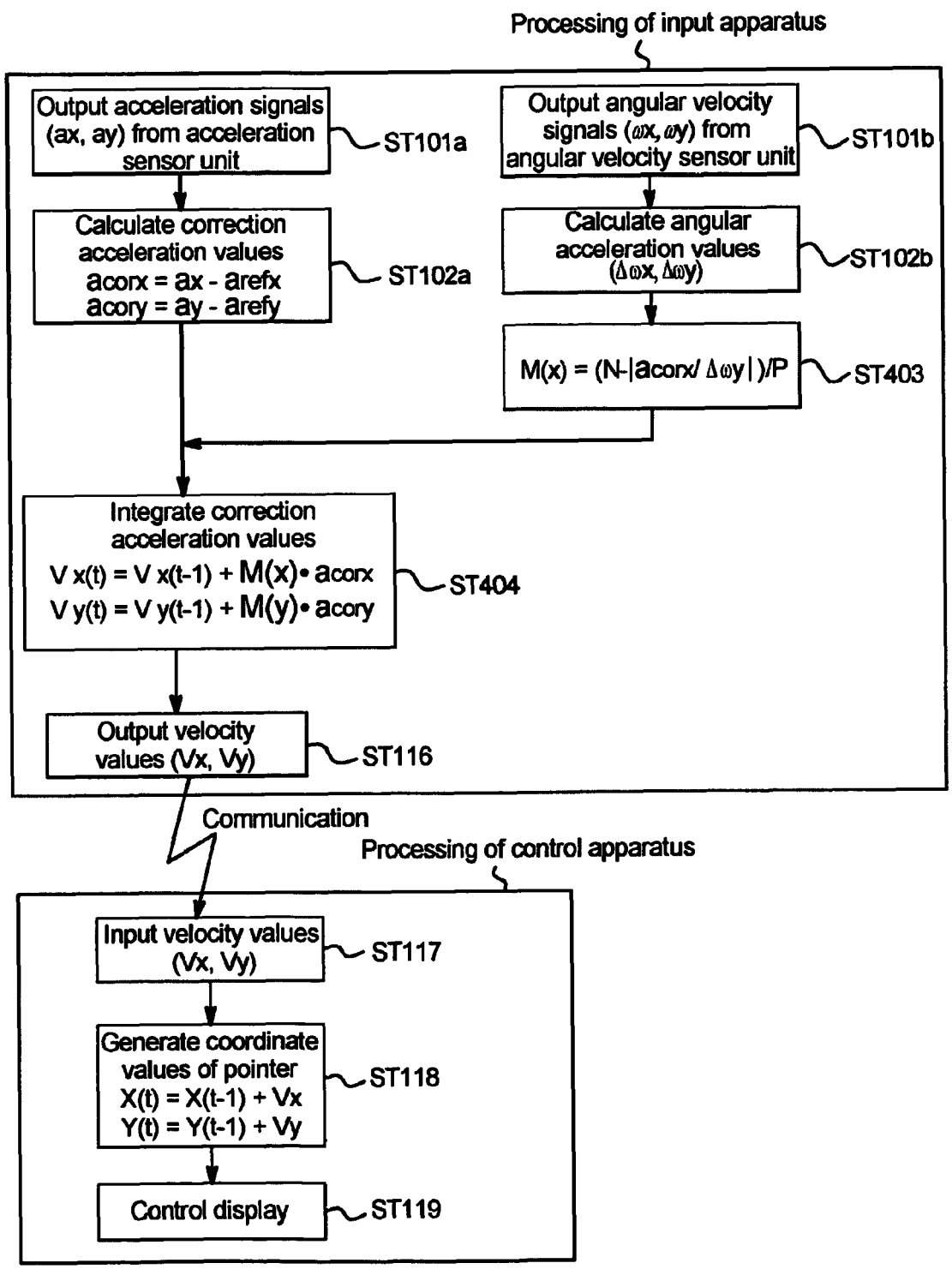
FIG. 19 is a flowchart showing an operation of an input apparatus according to a second embodiment using correlation characteristics.

FIG. 19 is a flowchart showing an operation of the input apparatus according to a second embodiment.

In a case where it is considered that the calculation using $R^2$ is heavy, the MPU uses a weight function using a ratio of $a_{corx}$, $\Delta\omega_y$, as correlation characteristics. For example, the MPU uses $|a_{corx}/\Delta\omega_y|$ to calculate a weight function $M(x)$ with Equation (10) (Step 403). The MPU uses the weight function $M(x)$ to calculate a velocity value expressed by Equation (11) (Step 404).

$$M(x) = (N - |a_{corx}/\Delta\omega_y|)/P \tag{10}$$

N, P: constant $$V_x(t) = V_x(t-1) + M(x) \cdot a_{corx} \tag{11}$$

Figure 16E:
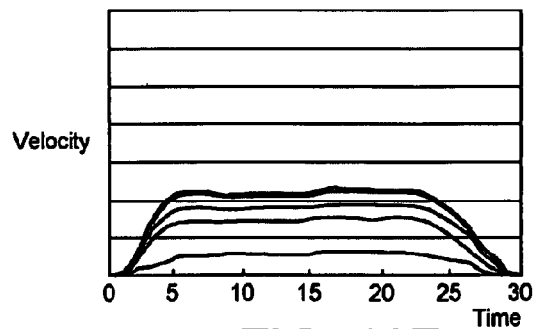
Figure 16F:
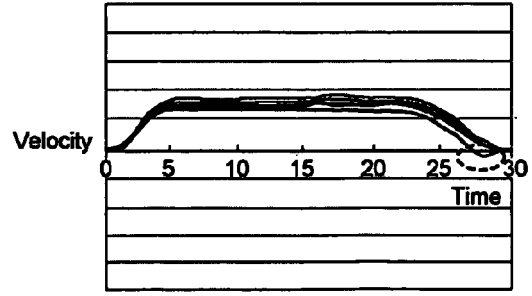

FIGS. 16E and 16F are graphs of simulations of the velocity of the pointer in a case of using Equation (10).

In the second embodiment, description has been made in view of the acceleration value (correction acceleration value). Also, since, as shown in FIGS. 15A and 15D, the angular velocity is similar to the velocity, the MPU may calculate the velocity value by using a ratio $|V_x/\omega_y|$ of the angular velocity and the velocity.

(Third Embodiment Using Correlation Characteristics)

FIG. 20 is a flowchart showing an operation of the input apparatus according to a third embodiment.

In a case where the acceleration sensor unit sensing small acceleration moves in the pitch and roll directions to be affected by gravity, a ratio of $a_{corx}$ with respect to $\Delta\omega_y$, which is the measured inertial force value not affected by gravity, increases. Herein, when $|a_{corx}/\Delta\omega_y|$ described above exceeds a MAX value, which may be generated with a normal arm swing, the MPU judges that the measured $a_{corx}$ has too large an error signal, and does not calculate Equation (11) with regard to the measured $a_{corx}$ and sets the previous value as the present value.

For example, the MPU can execute the processing as follows. In a case where $|a_{corx}/\Delta\omega_y| < Th3$ (in which Th3 is a constant) is established (Yes in Step 503), in Equation (11), $M(x) = 1$ is applied (Step 504). In other cases, $M(x) = 0$ is applied (Step 505).

Figure 17A:
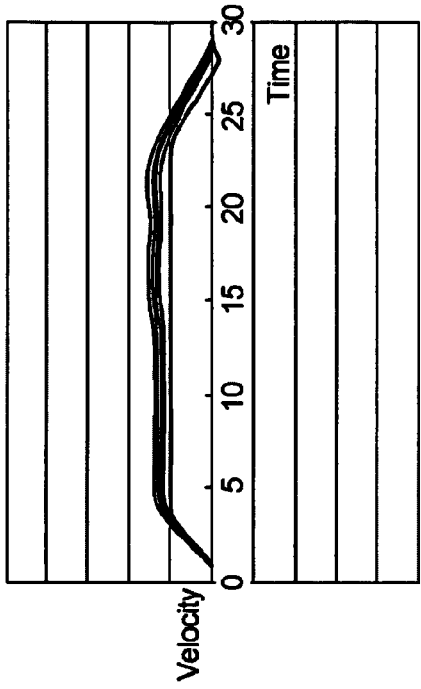
FIG. 17 are graphs each showing a simulation of a velocity of a pointer under different angular velocity or different acceleration.

FIGS. 17A and 17B are graphs of simulations of the velocity of the pointer in a case of using Equation (11). It should be noted that in FIG. 17A, in a case where the angular velocity is extremely small, the velocity of the pointer is small and the velocity value is not corrected. In this case, it is judged as a noise due to shake and the like, and the noise is cut by a shake correction circuit additionally provided to the input apparatus, which causes no problem.

In the third embodiment, description has been made in view of the acceleration value (correction acceleration value). Also, since, as shown in FIGS. 15A and 15D, the angular velocity is similar to the velocity, in view of the angular velocity and the velocity and based on the similar idea, the MPU may execute processing to judge if $|V_x/\omega_y| < Th4$ is established, to thereby calculate the velocity value.

(Fourth Embodiment Using Correlation Characteristics)

Figure 21:
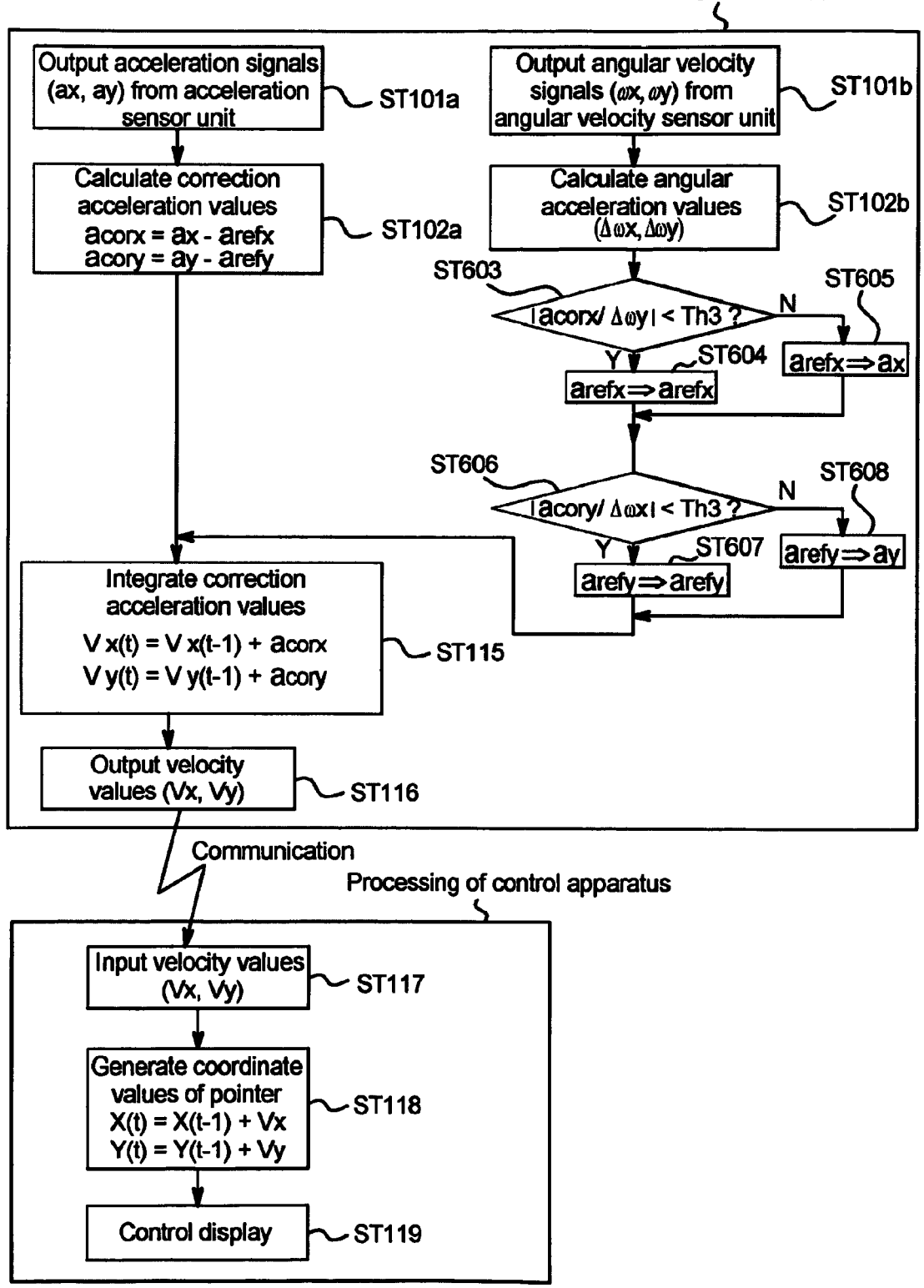
FIG. 21 is a flowchart showing an operation of an input apparatus according to a fourth embodiment using correlation characteristics.

FIG. 21 is a flowchart showing an operation of the input apparatus according to a fourth embodiment.

In the third embodiment using the correlation characteristics, in the case where $|a_{corx}/\Delta\omega_y| < Th3$ is established (Yes in Step 603), the calculated velocity value is used as it is (Step 604). In other cases, the acceleration value $a_x$ obtained at that time is set as the reference acceleration value $a_{refx}$ (Step 605), to thereby calculate the velocity value.

Figure 17D:
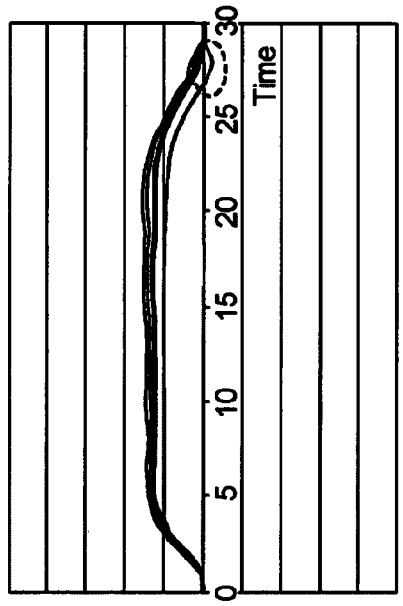
Figure 17A:
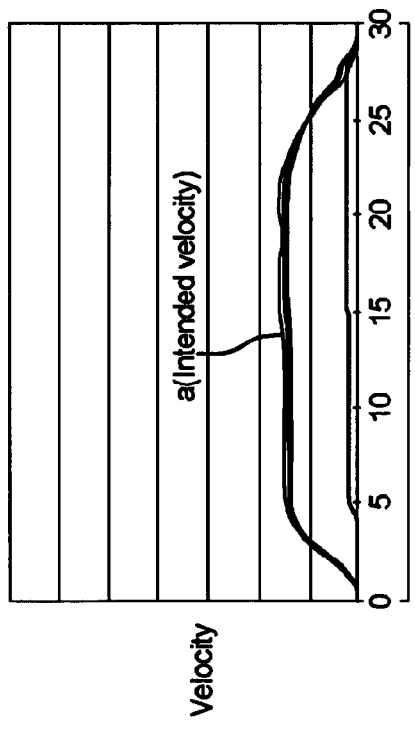
Figure 17C:
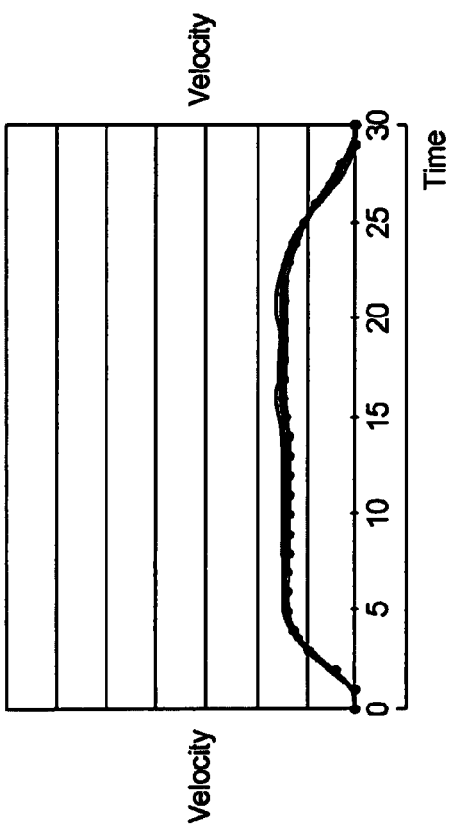

FIGS. 17C and 17D are graphs of simulations of the velocity of the pointer in the processing flow shown in FIG. 21.

In the fourth embodiment, description has been made in view of the acceleration value (correction acceleration value). Also, since, as shown in FIGS. 15A and 15D, the angular velocity is similar to the velocity, in view of the angular velocity and the velocity and based on the similar idea, the MPU may use the calculated velocity value as it is in a case where $|V_x/\omega_y| < Th4$ is established, and may set the previous velocity value as the present velocity value in other cases.

As in the first to fourth embodiments using the correlation characteristics, by using the correlation characteristics of the acceleration value and the angular acceleration value, the gravity effect as shown in FIG. 16B can be reduced. Of those, the second to fourth embodiments can reduce the calculation amount, which are useful. However, if the hardware performance is improved, the first embodiment is more actively used, which can most reduce errors.

Further, by using the correlation characteristics of the velocity value and the angular velocity value, it is possible to suppress an uncomfortable operational feeling of a user operating the input apparatus with regard to the relationship between the angular velocity about the X axis or the Y axis and the velocity of the movement of the pointer.

(Fifth Embodiment Using Correlation Characteristics)

In a case where the posture of the input apparatus abruptly changes or in a case where a velocity profile of the input apparatus has less constant velocity region (see FIG. 23), an acceleration in a direction opposite to the inertial force (acceleration) applied to the input apparatus may be output. In this case, even in the first to fourth embodiments, a small amount of the acceleration may not adequately be corrected. For example, as shown in FIGS. 16F, 17D, and 22A, there is a fear in that, just before the velocity of the pointer becomes zero when the pointer is reducing the velocity, the pointer is assumed to have a negative velocity, with the result that the pointer moves in the opposite direction.

Figure 23:
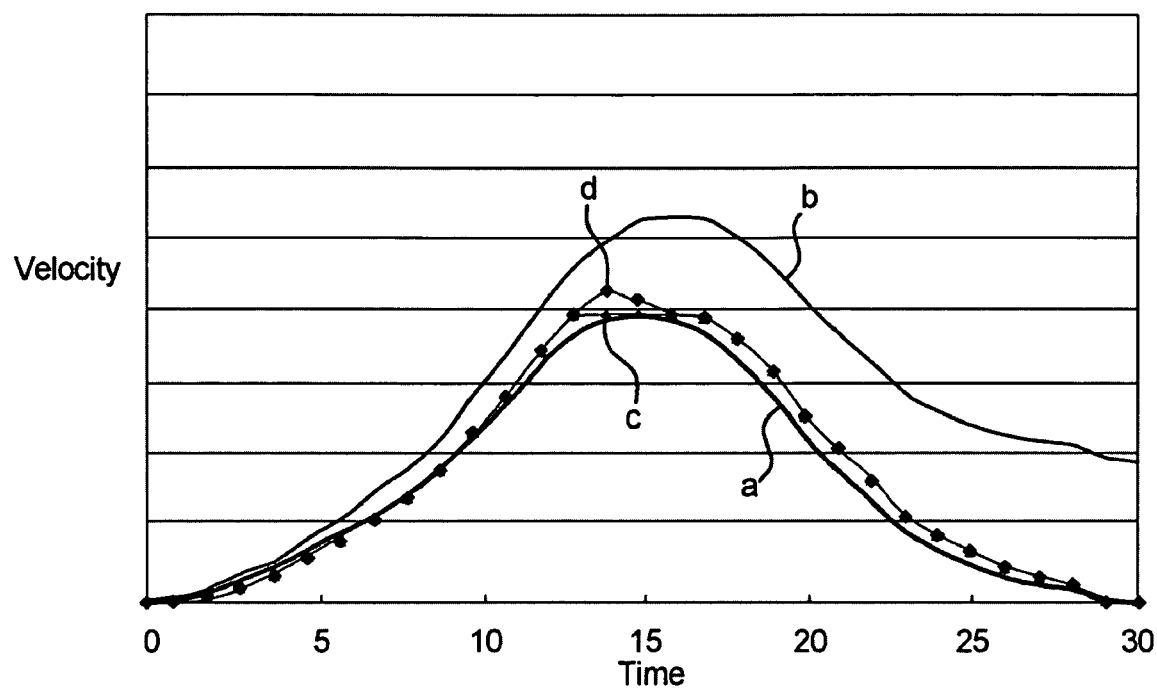
FIG. 23 shows a simulation of velocity illustrating an example in which there is almost no constant velocity portion, i.e., an example showing short-distance movement of the input apparatus.

The simulation of FIG. 23 shows an example including almost no constant velocity portion, i.e., short-distance movement of the input apparatus. At an inflection point (concave to convex) of the velocity profile, signs of the acceleration change. However, due to the effect of gravity, the inflection point on the intended line (bold line) a is different in timing from the inflection point on the line b, i.e., the inflection point on the line b is later in timing. As a result, a profile of an example (line d) which does not compare signs of $\Delta\omega_y$ and $a_{corx}$ is ununiformly disturbed.

In order to address the above problems, the MPU compares the signs of $\Delta\omega_y$ and $a_{corx}$. In a case where the signs are inverted, $a_{corx}$ concerned is not used, and the previous velocity value is set as the present velocity value. That is, because the MPU 19 records the calculated velocity values in a memory or the like and updates the velocity value as needed, in the case where the signs do not coincide with each other, the MPU 19 does not update the velocity value and have only to output the previous velocity value. As a result, as shown in FIG. 22B, the velocity value becomes zero just before the velocity value reaches zero, whereby an operational feeling that matches the intuition of the user can be obtained. In the example of FIG. 23, the line c represents a case where the signs of $\Delta\omega_y$ and $a_{corx}$ are compared. The line c is closer to the intended line than the line d is.

In the fifth embodiment, description has been made in view of the acceleration value (correction acceleration value). Also, since, as shown in FIGS. 15A and 15D, the angular velocity is similar to the velocity, with regard to the angular velocity and the velocity and based on the similar idea, the MPU may compare the signs of $V_x$ and $\omega_y$. In a case where the signs are the same, the calculated velocity value may be used as it is, and in other cases, the velocity value may be reset to zero.

Subsequently, an input apparatus according to another embodiment will be described.

Figure 24:
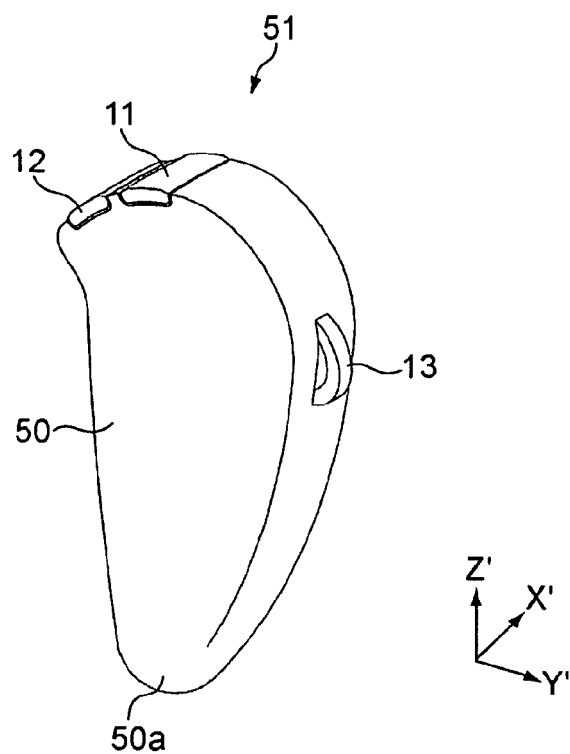
FIG. 24 is a perspective view showing an input apparatus according to another embodiment.
Figure 25:
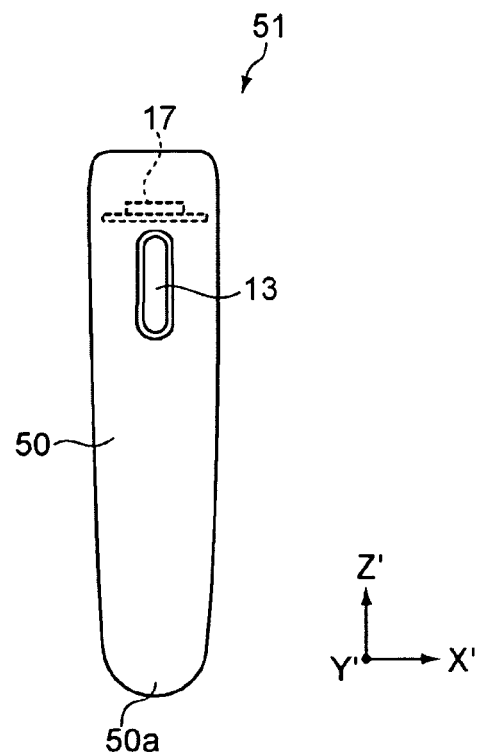
FIG. 25 is a side view of the input apparatus shown in FIG. 24 seen from a rotary button side.

FIG. 24 is a perspective view showing the input apparatus, denoted by reference numeral 51, according to this embodiment. FIG. 25 is a side view of the input apparatus 51 seen from the wheel button 13 side. In the following, description as to components, functions, and the like similar to those of the input apparatus 1 according to the embodiment described with reference to FIG. 2 and other figures will be simplified or omitted, and points different therefrom will mainly be described.

A casing 50 of the input apparatus 51 includes a partial sphere or partial quadric surface 50a provided at a predetermined position of a surface of the casing 50. Hereinafter, the partial sphere or partial quadric surface 50a will be referred to as "lower curved surface 50a" for convenience.

The lower curved surface 50a is located at a position substantially opposite to the buttons 11 and 12, i.e., a position where, when a user holds the input apparatus 51, a little finger is located closer to the lower curved surface 50a than the other fingers are located. In other words, assuming a case where, in the casing 50 elongated in one direction (Z'-axis direction), the sensor unit 17 is provided on a positive side of the Z' axis with respect to a center of the casing 50 in the Z'-axis direction, the lower curved surface 50a is provided on a negative side of the Z' axis.

Typically, the partial sphere surface is substantially a hemisphere surface, but does not necessarily have to be an exact hemisphere surface. The quadric surface is a curved surface obtained by expanding a 2-dimensional conic curve (quadric curve) into a 3-dimensional conic curve. Examples of the quadric surface include an ellipsoid surface, an ellipsoid paraboloid surface, and a hyperbolic surface.

Figure 26:
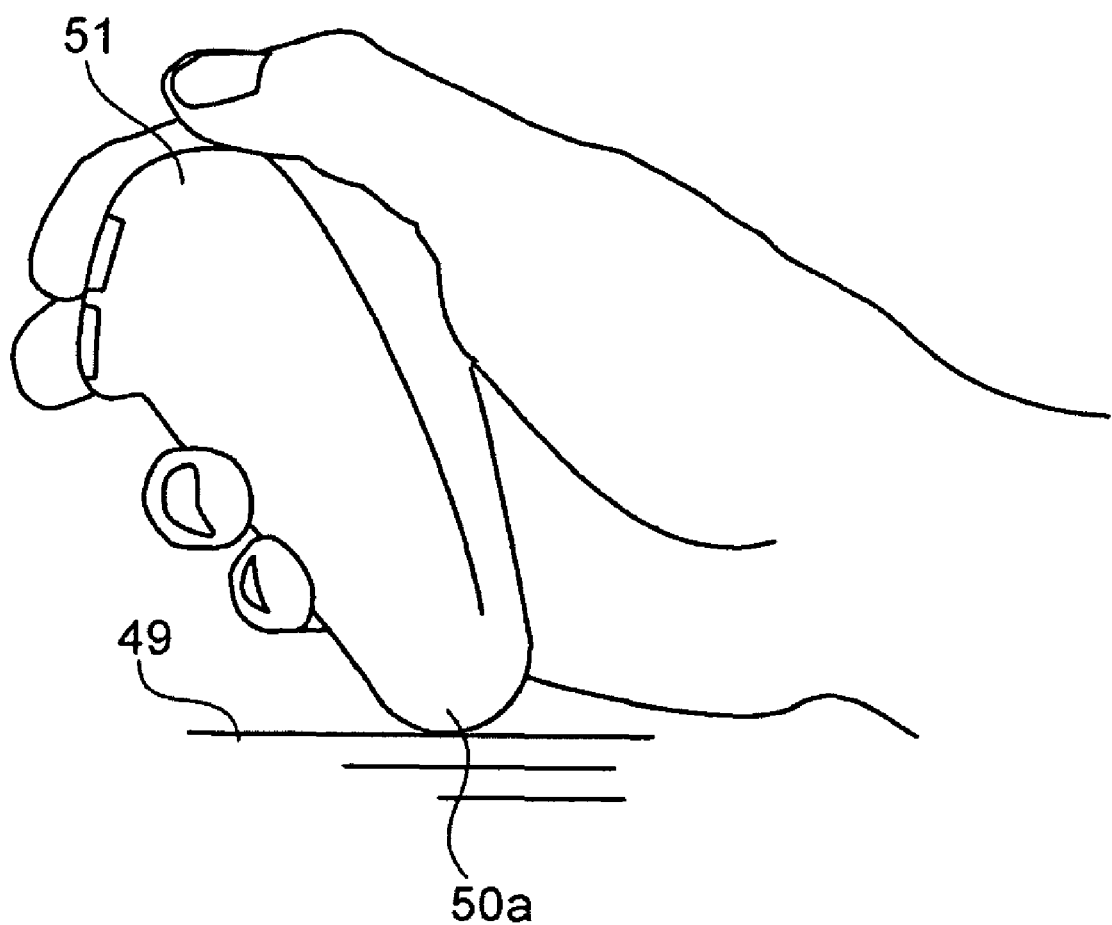
FIG. 26 is a view showing a state where the user operates the input apparatus while a lower curved surface thereof is in contact with an object such as a knee of the user.

With the configuration of the casing 50 of the input apparatus 51 as described above, a user can easily operate the input apparatus 51 while causing the lower curved surface 50a of the input apparatus 51 being a fulcrum to abut on an abutment target object 49 such as a table, a chair, a floor, or a knee or thigh of a user. That is, even in the state where the lower curved surface 50a of the input apparatus 51 is abutted on the abutment target object 49, the user can easily incline the input apparatus 51 in diverse angles, thereby enabling delicate operations such as placing the pointer on the icon. FIG. 26 is a view showing the state where the user operates the input apparatus 51 while causing the lower curved surface 50a thereof to abut on the abutment target object 49 such as a knee.

Further, according to this embodiment, erroneous operations due to hand movement, which cannot be corrected by the shake correction circuit, can be prevented from occurring. Moreover, because a user does not hold and operate the input apparatus 51 in the air, a user's fatigue can be reduced.

Figure 27:
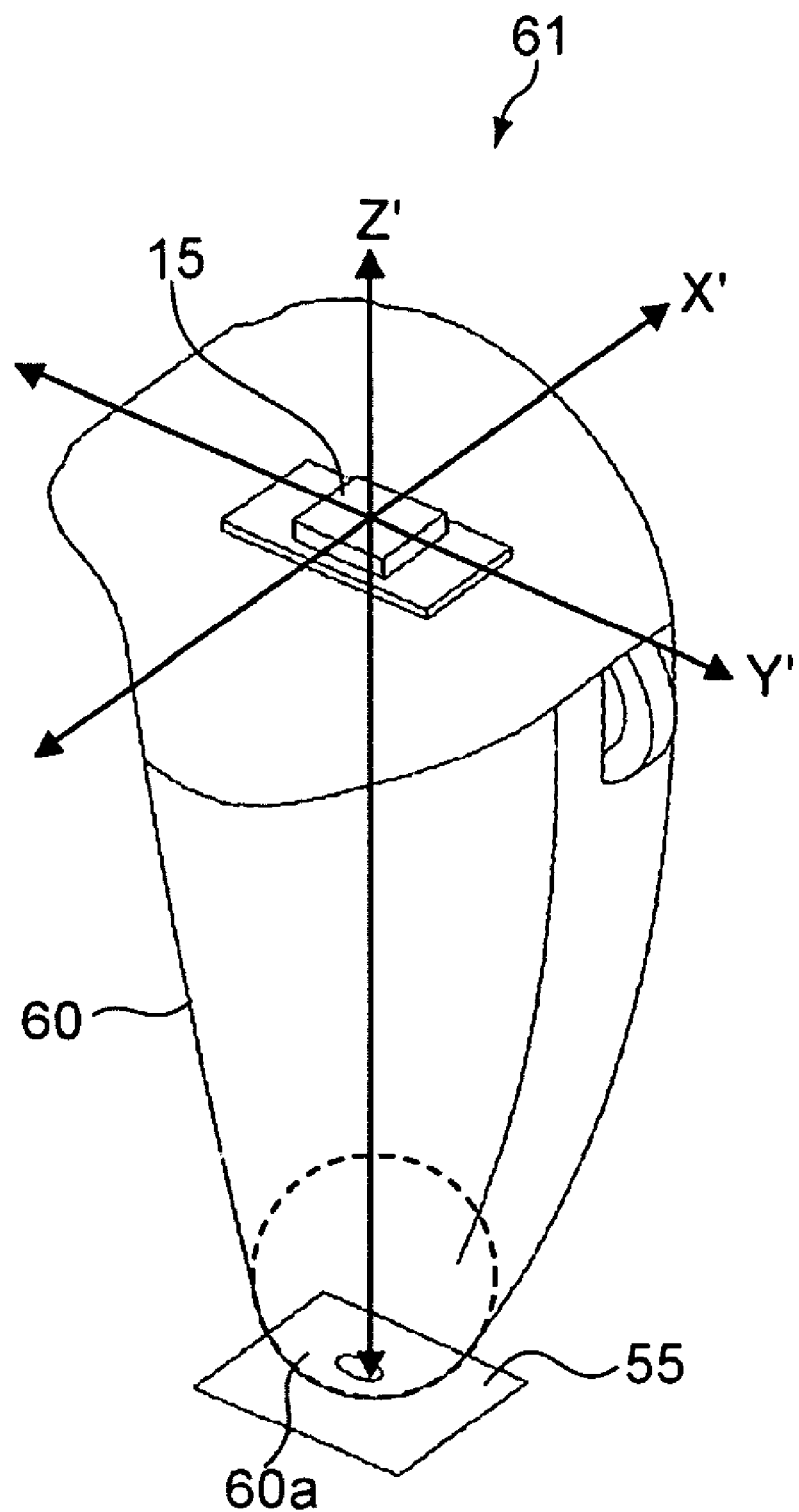
FIG. 27 is a perspective view showing an input apparatus according to still another embodiment.

FIG. 27 is a perspective view showing an input apparatus according to still another embodiment.

A casing 60 of the input apparatus, denoted by reference numeral 61, includes, similar to the input apparatus 51 as shown in FIGS. 24 and 25, a partial sphere surface, i.e., a lower curved surface 60a. A plane perpendicular to a maximum length direction (Z'-axis direction) of the casing 60 of the input apparatus 61 and is in contact with the lower curved surface 60a (hereinafter, referred to as "lower end plane 55" for convenience) is substantially parallel to a plane formed by the X axis and the Y axis (see FIG. 8) being the detection axes of the angular velocity sensor unit 15 (X-Y plane).

With the configuration of the input apparatus 61 as described above, in a case where the user operates the input apparatus 61 while causing the lower curved surface 60a to abut on the lower end plane 55, angular velocities applied to the input apparatus 61 are directly input to the angular velocity sensor unit 15. Thus, an amount of calculation required to obtain detection values from the detection signals from the angular velocity sensor unit 15 can be reduced.

Figure 28:
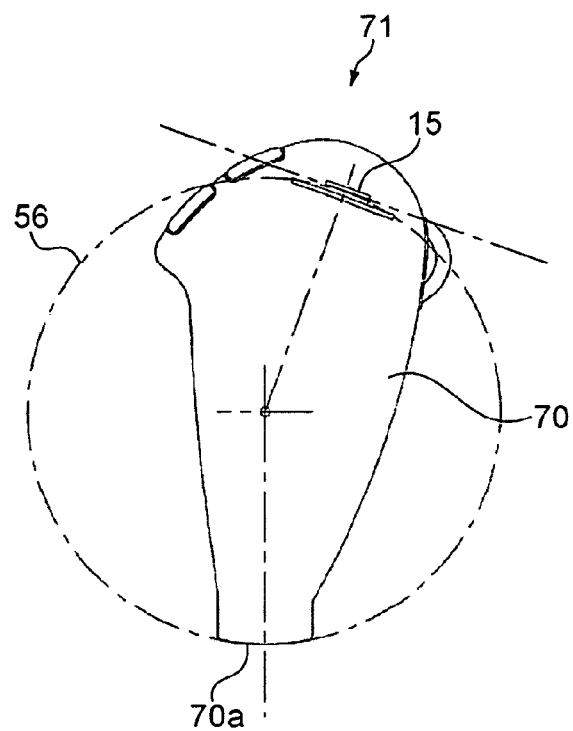
FIG. 28 is a front view showing an input apparatus according to yet another embodiment.
Figure 29:
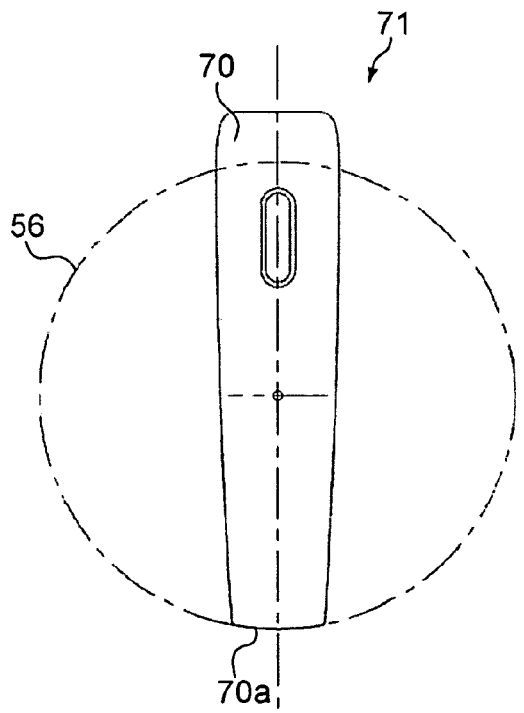
FIG. 29 is a side view showing the input apparatus shown in FIG. 28.

FIG. 28 is a front view showing an input apparatus according to yet another embodiment. FIG. 29 is a side view showing the input apparatus.

A lower curved surface 70a of a casing 70 of the input apparatus, denoted by reference numeral 71, is, for example, a partial sphere surface. The lower curved surface 70a has a larger curvature radius than the lower curved surfaces 50a and 60a of the input apparatuses 51 and 61 shown in FIGS. 24 and 27. The angular velocity sensor unit 15 is provided at a position at which a line on the X-Y plane formed by the X axis and the Y axis being the detection axes of the angular velocity sensor unit 15 corresponds to a tangent line of a virtual circle 56 that passes the partial sphere surface when seen in each of the X- and Y-axis directions. As long as the condition as described above is satisfied, the angular velocity sensor unit 15 may be arranged in the casing 70 such that the X-Y plane thereof is tilted with respect to a longitudinal direction of the input apparatus 71 (see FIG. 28).

Accordingly, a direction of the vector of the angular velocities generated when the user operates the input apparatus 71 while abutting the lower curved surface 70a thereof on the abutment target object 49 and the detection direction of the angular velocity sensor unit 15 match, so a linear input is enabled.

Figure 30:
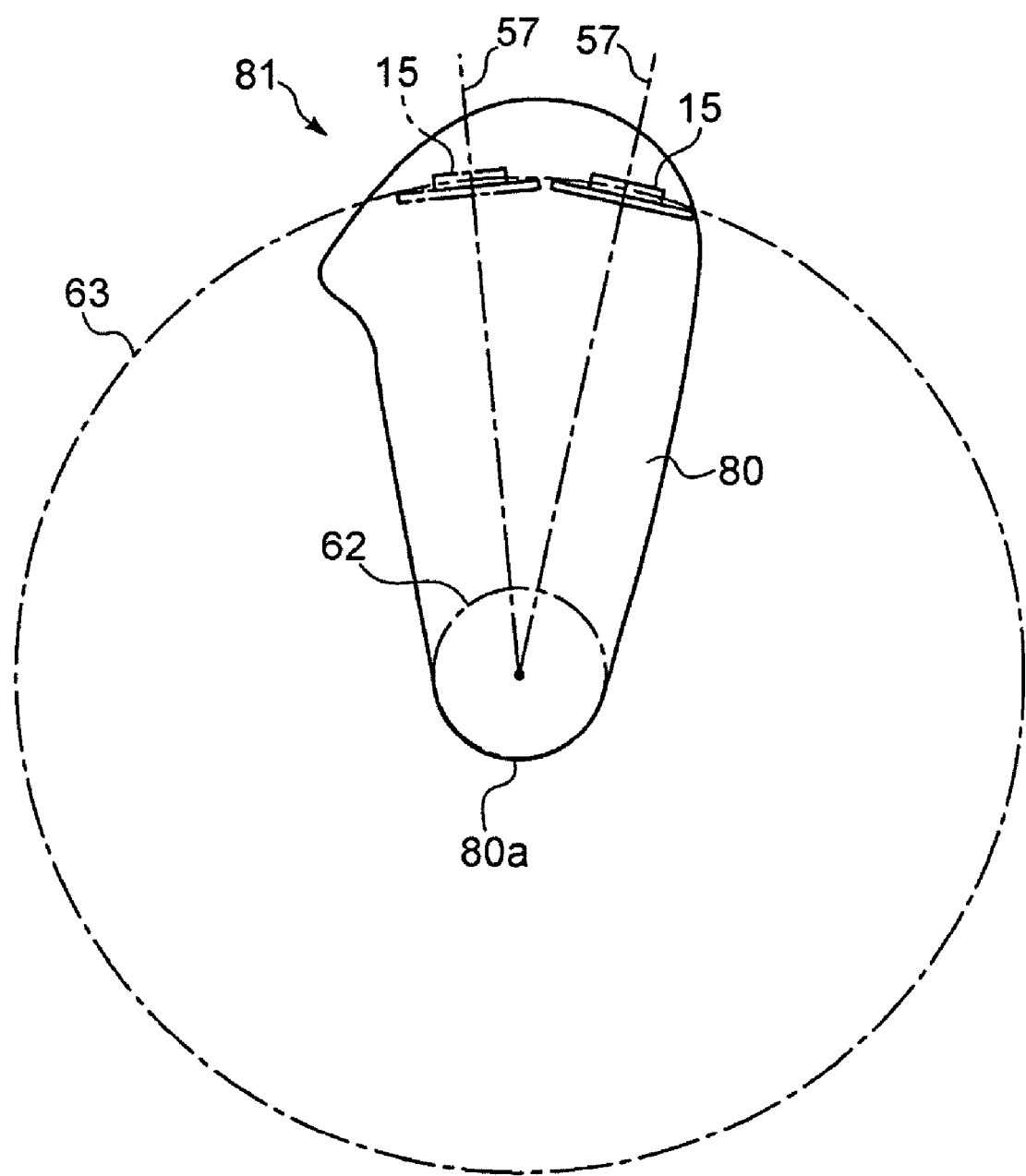
FIG. 30 is a front view of an input apparatus according to still another embodiment.

FIG. 30 is a front view of an input apparatus according to still another embodiment.

A lower curved surface 80a being a partial sphere surface of a casing 80 of the input apparatus, denoted by reference numeral 81, has a curvature radius the same as or close to that shown in FIG. 27. Regarding the arrangement of the angular velocity sensor unit 15, a virtual straight line that passes an intersection between the X axis and the Y axis, which is a center point of the angular velocity sensor unit 15, and is perpendicular to the X axis and the Y axis passes a center point O of a first sphere 62 including the lower curved surface 80a. With the configuration as described above, the first sphere 62 including the lower curved surface 80a and a second sphere 63 whose tangent line corresponds to a straight line on the X-Y plane of the angular velocity sensor unit 15 are arranged concentrically. Therefore, the input apparatus 81 bears the same effect as that of the input apparatus 71 shown in FIG. 28.

It should be noted that the input apparatus 51, 61, 71, or 81 including the partial sphere or partial quadric surface described above does not necessarily need to be operated while the lower curved surface 50a, 60a, 70a, or 80a thereof is abutted against the abutment target object 49, and may of course be operated in the air.

The present application is not limited to the embodiments as described above, and other various modifications can be made.

In the embodiment shown in FIG. 11, the calculation is executed mainly by the input apparatus 1. In the embodiment shown in FIG. 14, the calculation is executed mainly by the control apparatus 40. However, the calculation may appropriately be divided by the input apparatus 1 and the control apparatus 40 to be executed. The same can be applied to the embodiments shown in FIGS. 18 to 21.

Alternatively, the processing shown in FIG. 18 (or FIG. 19, 20, or 21) and part of the processing shown in FIG. 11 may be combined to be executed. For example, after execution of Step 303 of FIG. 18, Steps 109 to 114 of FIG. 11 may be executed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input apparatus, comprising:
a first acceleration sensor detecting a first acceleration value in a first direction;
a second acceleration sensor detecting a second acceleration value in a second direction different from the first direction;
a first angular velocity sensor detecting a first angular velocity value about a first axis in the first direction;
a second angular velocity sensor detecting a second angular velocity value about a second axis in the second direction; and
velocity information output means for calculating, based on the first acceleration value, the second acceleration value, the first angular velocity value, and the second angular velocity value, a first velocity value in the first direction and a second velocity value in the second direction, and outputting information on the first velocity value and the second velocity value.

2. The input apparatus according to claim 1,
wherein the velocity information output means calculates a difference between the first acceleration value and a first reference acceleration value to obtain a first correction acceleration value, the first reference acceleration value being a component value of a gravity acceleration in the first direction, and calculates, based on the first correction acceleration value, the first velocity value.

3. The input apparatus according to claim 2, further comprising:
velocity correction means for correcting, based on the second angular velocity value, the first velocity value.

4. The input apparatus according to claim 3,
wherein the velocity correction means sets, in a case where an absolute value of the second angular velocity value is smaller than a threshold value, the first velocity value to zero.

5. The input apparatus according to claim 2, further comprising:
angular acceleration calculation means for calculating, based on the second angular velocity value, a second angular acceleration value about the second axis; and
judging means for judging, based on the second angular acceleration value, whether or not to update the first reference acceleration value.

6. The input apparatus according to claim 5, further comprising:
update means for updating, in a case where an absolute value of the second angular acceleration value is smaller than a threshold value, the first reference acceleration value.

7. The input apparatus according to claim 1, further comprising:
angular acceleration calculation means for calculating, based on the second angular velocity value, a second angular acceleration value about the second axis,
wherein the velocity information output means calculates, by using a correlation characteristic representing a correlation between the first acceleration value and the second angular acceleration value, the first velocity value.

8. The input apparatus according to claim 7,
wherein the correlation characteristic is one of a correlation coefficient and a correlation function using the first acceleration value and the second angular acceleration value, and
wherein the velocity information output means calculates, by multiplying the first acceleration value by one of the correlation coefficient and the correlation function respectively being a weight coefficient and a weight function, the first velocity value.

9. The input apparatus according to claim 7,
wherein the correlation characteristic is a ratio between the first acceleration value and the second angular acceleration value, and
wherein the velocity information output means calculates, by using the ratio, the first velocity value.

10. The input apparatus according to claim 5,
wherein the velocity information output means includes an update means for recording and updating at least the first velocity value calculated,
wherein the velocity information output means judges whether or not signs of the first acceleration value and the second angular acceleration value coincide with each other, and
wherein the update means avoids to update, in a case where the signs fail to coincide with each other, the first acceleration value.

11. A control apparatus controlling a user interface displayed on a screen based on input information output from an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, the control apparatus comprising:
reception means for receiving, as the input information, information on the first acceleration value, the second acceleration value, the first angular velocity value, and the second angular velocity value; and
coordinate information generation means for calculating, based on the received input information, a first velocity value in the first direction and a second velocity value in the second direction, and generating coordinate information on the user interface on the screen.

12. A control system, comprising:

an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, a second angular velocity sensor detecting a second angular velocity value about a second axis in the second direction, and velocity information output means for calculating, based on the first acceleration value, the second acceleration value, the first angular velocity value, and the second angular velocity value, a first velocity value in the first direction and a second velocity value in the second direction, and outputting information on the first velocity value and the second velocity value as input information; and a control apparatus including reception means for receiving the input information, and coordinate information generation means for generating, based on the received input information, coordinate information on the user interface on the screen.

13. A control system, comprising:

an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, a second angular velocity sensor detecting a second angular velocity value about a second axis in the second direction, and output means for outputting, as input information, information on the first acceleration value, the second acceleration value, the first angular velocity value, and the second angular velocity value; and a control apparatus including reception means for receiving the input information, and coordinate information generation means for calculating, based on the received input information, a first velocity value in the first direction and a second velocity value in the second direction, and generating, based on the first velocity value and the second velocity value, coordinate information on the user interface on the screen.

14. A control method controlling, in response to movement of an input apparatus, a user interface on a screen, comprising:

detecting a first acceleration value of the input apparatus in a first direction;

detecting a second acceleration value of the input apparatus in a second direction different from the first direction;

detecting a first angular velocity value of the input apparatus about a first axis in the first direction;

detecting a second angular velocity value of the input apparatus about a second axis in the second direction;

calculating, based on the first acceleration value, the second acceleration value, the first angular velocity value, and the second angular velocity value, a first velocity value in the first direction and a second velocity value in the second direction; and generating, based on the first velocity value and the second velocity value, coordinate information on the user interface on the screen.

15. A program, on a computer readable medium, for an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, the program causing the input apparatus to execute:

calculating, based on the first acceleration value, the second acceleration value, the first angular velocity value, and the second angular velocity value, a first velocity value in the first direction and a second velocity value in the second direction; and outputting information on the first velocity value and the second velocity value.

16. A program, on a computer readable medium, for a control apparatus controlling a user interface displayed on a screen based on input information output from an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, the program causing the control apparatus to execute:

receiving, as the input information, information on the first acceleration value, the second acceleration value, the first angular velocity value, and the second angular velocity value; and calculating, based on the received input information, a first velocity value in the first direction and a second velocity value in the second direction, and generating coordinate information on the user interface on the screen.

17. A control apparatus controlling a user interface displayed on a screen based on input information output from an input apparatus including a first acceleration sensor detecting a first acceleration value in a first direction, a second acceleration sensor detecting a second acceleration value in a second direction different from the first direction, a first angular velocity sensor detecting a first angular velocity value about a first axis in the first direction, and a second angular velocity sensor detecting a second angular velocity value about a second axis in the second direction, the control apparatus comprising:

a reception unit receiving, as the input information, information on the first acceleration value, the second acceleration value, the first angular velocity value, and the second angular velocity value; and a coordinate information generation unit calculating, based on the received input information, a first velocity value in the first direction and a second velocity value in the second direction, and generating coordinate information on the user interface on the screen.

* * * * *